(12) United States Patent
Higaki et al.

(10) Patent No.: US 8,074,032 B2
(45) Date of Patent: *Dec. 6, 2011

(54) STORAGE CONTROLLER, STORAGE CONTROL SYSTEM, AND STORAGE CONTROL METHOD

(75) Inventors: Seiichi Higaki, Ninomiya (JP); Hisao Honma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 416 days.

This patent is subject to a terminal disclaimer.

(21) Appl. No.: 12/041,418

(22) Filed: Mar. 3, 2008

(65) Prior Publication Data

US 2008/0162960 A1 Jul. 3, 2008

Related U.S. Application Data

(63) Continuation of application No. 11/038,065, filed on Jan. 21, 2005, now Pat. No. 7,360,037.

(30) Foreign Application Priority Data

Oct. 1, 2004 (JP) ................................ 2004-290576

(51) Int. Cl.
G06F 13/00 (2006.01)
G06F 13/28 (2006.01)
G06F 1/26 (2006.01)

(52) U.S. Cl. ................ 711/154; 711/114; 711/E12.084; 713/310

(58) Field of Classification Search .......................... None
See application file for complete search history.

(56) References Cited

U.S. PATENT DOCUMENTS

| 5,900,007 | A | * | 5/1999 | Nunnelley et al. ................. 711/4 |
| 6,463,573 | B1 | | 10/2002 | Maddalozzo, Jr. et al. |
| 6,583,947 | B1 | | 6/2003 | Hakamata et al. |
| 7,051,121 | B2 | | 5/2006 | Ohno et al. |

(Continued)

FOREIGN PATENT DOCUMENTS

EP 1 357 476 10/2003

(Continued)

OTHER PUBLICATIONS

Jon L. Jacobi,"Hands-On With Next-Generation Drive",PC World [online], Thrusday Oct. 31, 2002 [retrieved on Apr. 7, 2007], Retrieved from the Internet<URL:http://www.pcworld.com/article/id,106211-page,1/article.html>.*

(Continued)

*Primary Examiner* — Reginald Bragdon
*Assistant Examiner* — Eric S Cardwell
(74) *Attorney, Agent, or Firm* — Antonelli, Terry, Stout & Kraus, LLP.

(57) ABSTRACT

There is provided a storage control system in which various controls to a plurality of storage controllers connected to each other can be effectively performed. The storage control system controls first and second storage controllers, in which a second storage controller 10 is connected to a first storage controller 1-1 to which a host system 1-2 is connected. With reference to a memory in which a table defining correspondence relationships between internal logical volumes and a host logical volume 32 of the second storage controller 10 is stored, a channel adapter 1-3 of the first storage controller 1-1 controls power supplies of driving mechanisms of storage devices corresponding to the internal logical volumes.

24 Claims, 15 Drawing Sheets

U.S. PATENT DOCUMENTS

| 7,127,445 B2 | 10/2006 | Mogi et al. | |
|---|---|---|---|
| 7,337,374 B2 | 2/2008 | Taninaka et al. | |
| 2006/0277378 A1* | 12/2006 | Morishita et al. | 711/162 |

FOREIGN PATENT DOCUMENTS

| EP | 1 369 772 | 12/2003 |
|---|---|---|
| EP | 1 376 591 | 1/2004 |
| JP | 04-168518 | 6/1992 |
| JP | A 1995-261944 | 10/1995 |
| JP | 11-015604 | 1/1999 |
| JP | 11-249815 | 9/1999 |
| JP | 2003-157152 | 5/2003 |

OTHER PUBLICATIONS

T10 Technical Committee: Information Technology—SCSI Enclosure Services—2 (SES-2) Online, Jul. 22, 2004, XP007900032, Retrieved From the Internet: URL:http://www.t10.org/ftp/t10/draft/ses2/ses2r09.pdf> retrieved Feb. 24, 2006, p. 12, line 30—p. 13, line 15.

Jacobi, Jon L., "Hands-On With Next-Generation Drive", PC World (online), Thursday, Oct. 31, 2002 [retrieved on Apr. 7, 2007], from Internet<URL:http://www.pcworld.com/article/id,206322- page,1/article.html>.

* cited by examiner

FIG. 5

MAP TABLE OF HOST LOGICAL VOLUME-INTERNAL LOGICAL VOLUME

| HOST LOGICAL VOLUME NUMBER | INTERNAL LOGICAL VOLUME NUMBER |
|---|---|
| HLV1 | ILV1 |
| HLV2 | ILV3 |
| HLV3 | ILV7 |
| ⋮ | ⋮ |
| ⋮ | ⋮ |
| ⋮ | ⋮ |
| HLVm | ILVn |

FIG. 6

MAP TABLE OF INTERNAL LOGICAL VOLUME-LOGICAL VOLUME WITHIN ECC GROUP/ EXTERNAL STORAGE CONTROLLER

| INTERNAL LOGICAL VOLUME NUMBER | DEVICE INFORMATION | | | | | | | PATH INFORMATION | |
|---|---|---|---|---|---|---|---|---|---|
| | DEVICE IDENTIFICATION INFORMATION | CAPACITY (KB) | UPDATE DATE | DEVICE TYPE | INTERNAL/ EXTERNAL | PROTECTION DESIGNATION | POWER SUPPLY CONTROL | WWN | LUN |
| 0 | INTERNAL | 200,000 | 02/01/2004 | FC | INTERNAL | POSSIBLE | IMPOSSIBLE | INTERNAL | INTERNAL |
| 1 | INTERNAL | 400,000 | 03/01/2004 | S-ATA | INTERNAL | POSSIBLE | POSSIBLE | INTERNAL | INTERNAL |
| 2 | CCCCC | 700,000 | 04/01/2004 | S-ATA | EXTERNAL | POSSIBLE | IMPOSSIBLE | WWN2 | 5 |
| 3 | DDDDD | 300,000 | NULL | S-ATA | EXTERNAL | POSSIBLE | POSSIBLE | WWN3 | 4 |
| 4 | EEEEE | 50,000 | 05/01/2004 | TAPE | EXTERNAL | IMPOSSIBLE | IMPOSSIBLE | WWN4 | 9 |
| 5 | FFFFF | 200,000 | 06/01/2004 | S-ATA | EXTERNAL | IMPOSSIBLE | IMPOSSIBLE | WWN5 | 6 |

FIG. 11
ACCESS ATTRIBUTE MANAGEMENT TABLE

T3

| LDEV#LU | READ INHIBITION BIT | WRITE INHIBITION BIT | INQUIRY INHIBITION BIT | READ CAPACITY 0 REPORT BIT | S-VOL DISABLE BIT |
|---|---|---|---|---|---|
| #01 | 0 | 0 | 0 | 0 | 0 |
| #02 | 0 | 1 | 0 | 0 | 0 |
| #03 | 1 | 1 | 0 | 0 | 0 |
| #04 | 0 | 0 | 0 | 0 | 0 |
| ⋮ | ⋮ | ⋮ | ⋮ | ⋮ | ⋮ |

FIG. 12A

RELATIONSHIP BETWEEN ATTRIBUTE MODE AND OPERATION

| ATTRIBUTE MODE \ OPERATION | READ | WRITE | INQUIRY | READ CAPACITY 0 | S-VOL DISABLE |
|---|---|---|---|---|---|
| READ/WRITE POSSIBILITY | ○ | ○ | ○ | ACTUAL CAPACITY | ○ |
| READ ONLY | ○ | × | ○ | ACTUAL CAPACITY | ○ |
| READ/WRITE PROHIBITION | × | × | ○ | ACTUAL CAPACITY | ○ |
| READ CAPACITY 0 | × | × | ○ | "0" | ○ |
| INQUIRY INHIBITION | × | × | × | × | ○ |
| S-VOL DISABLE | ○ | ○ | ○ | ACTUAL CAPACITY | × |

FIG. 12B

RELATIONSHIP BETWEEN ATTRIBUTE MODE AND ACCESS ATTRIBUTE CONTROL INFORMATION

| ATTRIBUTE MODE | ACCESS ATTRIBUTE CONTROL INFORMATION | | | | |
|---|---|---|---|---|---|
| | READ INHIBITION BIT | WRITE INHIBITION BIT | INQUIRY INHIBITION BIT | READ CAPACITY 0 REPORT BIT | S-VOL DISABLE BIT |
| READ/WRITE POSSIBILITY | 0 | 0 | 0 | 0 | 0 |
| READ ONLY | 0 | 1 | 0 | 0 | 0 |
| READ/WRITE PROHIBITION | 1 | 1 | 0 | 0 | 0 |
| READ CAPACITY 0 | 1 | 1 | 0 | 1 | 0 |
| INQUIRY INHIBITION | 1 | 1 | 1 | 1 | 0 |
| S-VOL DISABLE | 0 | 0 | 0 | 0 | 1 |
| RELEASE | 0 | 0 | 0 | 0 | 0 |

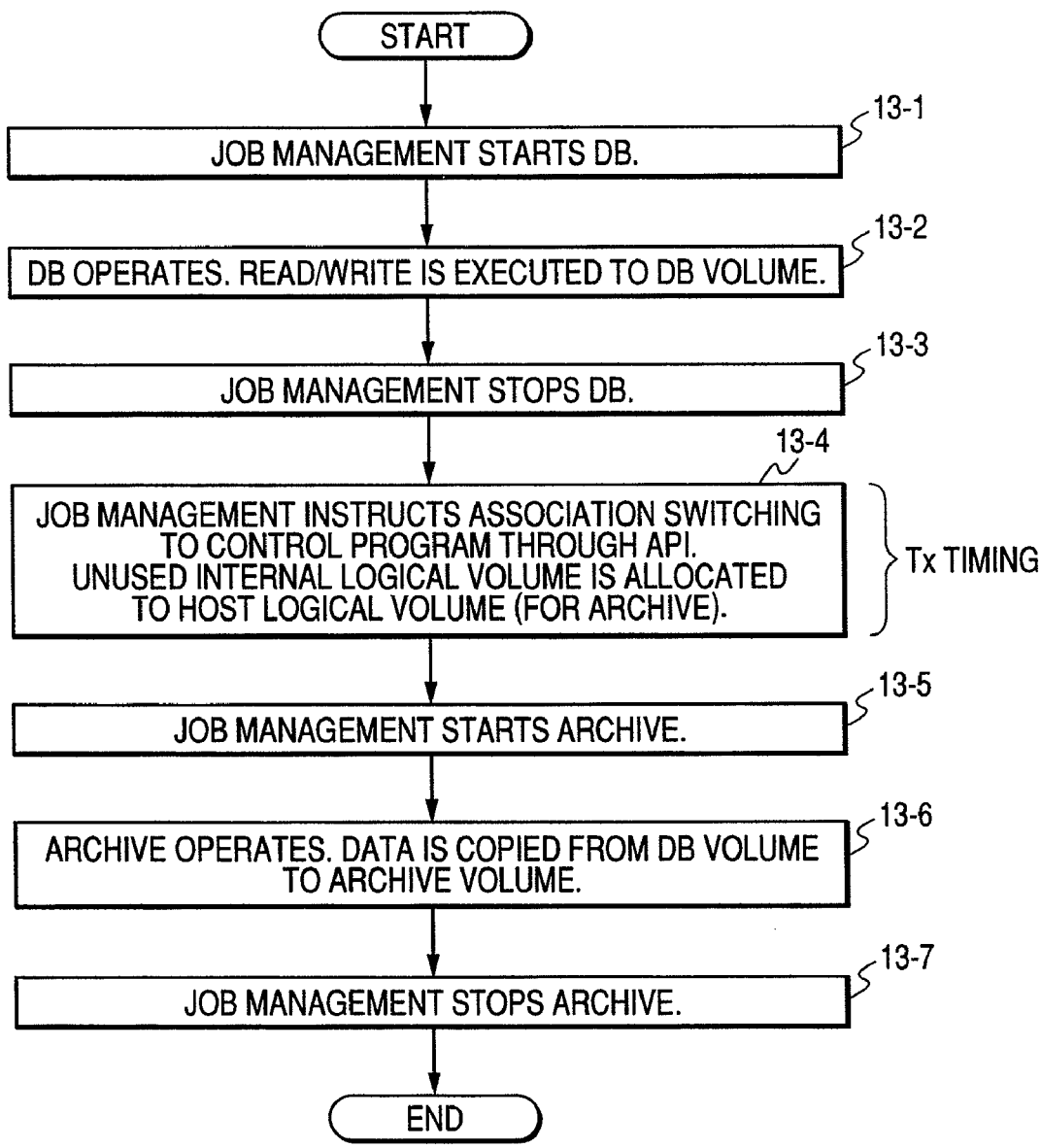

STORAGE CONTROLLER, STORAGE CONTROL SYSTEM, AND STORAGE CONTROL METHOD

CROSS REFERENCE TO RELATED APPLICATIONS

This application is a continuation of U.S. application Ser. No. 11/038,065, filed Jan. 21, 2005 now U.S. Pat. No. 7,360,037, and which application relates to and claims priority from Japanese Patent Application No. 2004-290576, filed on Oct. 1, 2004, the entire disclosures of which are incorporated herein by reference.

BACKGROUND OF THE INVENTION

The present invention relates in general to a storage control system in which a second storage controller is connected to a first storage controller. More specifically, the invention relates to a storage control system and a storage control method in which storage resources of the second storage controller can be controlled, for example, the power supplied to driving mechanisms of the storage resources can be controlled and control access of a host apparatus to the storage resources can be controlled.

As such a storage controller, a disk array device is known. This disk array device has a plurality of disk drives arranged in an array shape and is constructed based on a RAID (Redundant Array of Independent Inexpensive Disks) configuration. On physical storage areas of the respective disk devices, logical volumes (logical devices) which serve as logical storage areas are provided. The host apparatus can perform read and write operations of desired data to the disk drives by issuing write and read commands having predetermined formats to the disk array device.

As principal uses of such a disk array device, conventionally, transactions or databases are known. For these uses, the disk array device needs to have high performance and reliability. For this reason, as an HDD to be mounted on a storage controller which is employed for these uses, an HDD (Hard Disk Drive) having high performance and reliability is adopted. In general, an HDD satisfying such a performance criteria is expensive, since highly reliable parts must be used.

In order to suppress the power consumption of the disk array device having such an HDD, a technique, in which control of the current simply to a spindle motor for driving the HDD is performed, is disclosed in Japanese Patent Laid-Open No. 2000-293314.

In the field of use of a storage controller, a concept of DLCM (Data Life Cycle Management) has been proposed. According to this concept, by paying attention to the fact that a data value changes over time, effective data storing management is performed. For example, the storage of data having little value into an expensive disk array device, which is designated as 'the first tier' is a waste of the storage resources. Thus, information having little value is archived by using an inexpensive disk array device, such as a HDD, which is designated as 'the second tier' and which has a reliability, responsiveness, and durability lower than that of the first tier. Among data to be archived, there is data which is obligatorily preserved for a constant period under certain laws or office rules. This is different according to the type of data or the like. The kind of data should be preserved for a period of several years to tens of years (if necessary, beyond that period).

Japanese Patent Laid-Open No. 2000-293314 describes a system in which a second storage controller is connected to a first storage controller and stored data in the first storage controller is archived in the second storage controller. However, this configuration is used to control the power consumption with respect to the first storage controller and is not intended to control the power consumption with respect to other storage controllers connected to the first storage controller.

SUMMARY OF THE INVENTION

Accordingly, it is an object of the present invention to provide a storage controller and a storage control system which can effectively perform various controls to a plurality of storage controllers connected to each other. Further, it is another object of the present invention to provide a storage control system which can effectively control the power supplied to driving devices of storage resources in other storage controllers which are connected to a first storage controller. In addition, it is still another object of the present invention to provide a storage control system which can effectively control accesses to logical devices of other storage controllers which are connected to the storage controller. It is a further object of the present invention to provide a control method for use by such a control system.

In order to achieve the above-mentioned objects, there is provided a storage controller according to the invention, which is connected to a host system. The storage controller comprises a first storage device, and a first control unit for controlling the first storage device, in which the first control unit is connected to another storage controller having a second storage device and a second control unit for controlling the second storage device. Further, the first control unit determines whether or not the power supply of a driving mechanism of the second storage device is controllable, and, if so, it transmits a command to the other storage controller so as to control the power supply of the driving mechanism of the second storage device. For example, the control unit is constructed by using a microprocessor of a channel adapter and a control host logical volume.

In addition, there are provided a storage control system and a control method thereof according to the present invention in which a second storage controller is connected to a first storage controller to which a host system is connected. Here, a control unit of the first storage controller or a host system is made to control a power supply of a storage device of the second storage controller or to access attributes of logical volumes.

According to a first aspect of the invention, there is provided a storage control system comprising a first storage controller having a channel adapter which is connected to a host system and which provides one or more first logical volumes capable of being accessed by the host system, one or more second logical volumes corresponding to the first logical volumes and being used as storage areas for data transmitted to and received from the channel adapter, a plurality of disk drives that are written with data with respect to the second logical volumes as a group of data having a redundant relationship, and a disk adapter that is connected to the plurality of disk drives for controlling the plurality of disk drives, and a second storage controller having third logical volumes corresponding to the second logical volumes and being connected to the first storage controller. The first storage controller further has a memory in which a table is stored which defines correspondence relationships between the second logical volumes and the third logical volumes. Further, the channel adapter is configured to access the third logical volumes of the second storage controller based on the correspondence relationships in the table and to control power supplies of driving mechanisms of storage devices corresponding to the third logical volumes.

In addition, according to another aspect of the present invention, there is provided a storage control system comprising a first storage controller which is connected to a host system and has a channel adapter providing one or more first logical volumes capable of being accessed by the host system, one or more second logical volumes corresponding to the first logical volumes and being used as storage areas for data transmitted to and received from the channel adapter, a plurality of disk drives which are written with data with respect to the second logical volumes as a group of data having a redundant relationship, and a disk adapter connected to the plurality of disk drives for controlling the plurality of disk drives, and a second storage controller having third logical volumes corresponding to the second logical volumes and being connected to the first storage controller. The first storage controller is configured to set up access controls for at least one of the second logical volumes and the third logical volumes.

According to the present invention, a storage control system and a control method of the storage control system are provided in which various controls to a plurality of storage controllers to be connected to each other can be effectively performed. Further, according to the present invention, a storage control system and a control method of the storage control system in which power supply controls to driving devices of storage resources of other storage controllers connected to a first storage controller can be effectively executed. In addition, the present invention can provide a storage control system and a control method of the storage control system in which access controls to logical devices of other storage controllers connected to a storage controller can be effectively executed.

BRIEF DESCRIPTION OF THE DRAWINGS

FIG. 5 is a mapping table of the host logical volume and the internal logical volumes;

FIG. 6 is a mapping table of internal logical volume ECC groups and an external storage controller;

FIG. 11 is a management table which associates the internal logical volumes with access attributes;

FIG. 12A is a diagram illustrating correspondence relationships between access attribute modes and authorized operations, and FIG. 12B is a diagram illustrating correspondence relationships between the access attribute modes and inhibition bits;

FIG. 13 is a flowchart showing cooperation operations between an archive application program and a database application program;

DESCRIPTION OF THE PREFERRED EMBODIMENTS

Next, an embodiment of the present invention will be described.

Figure 1:
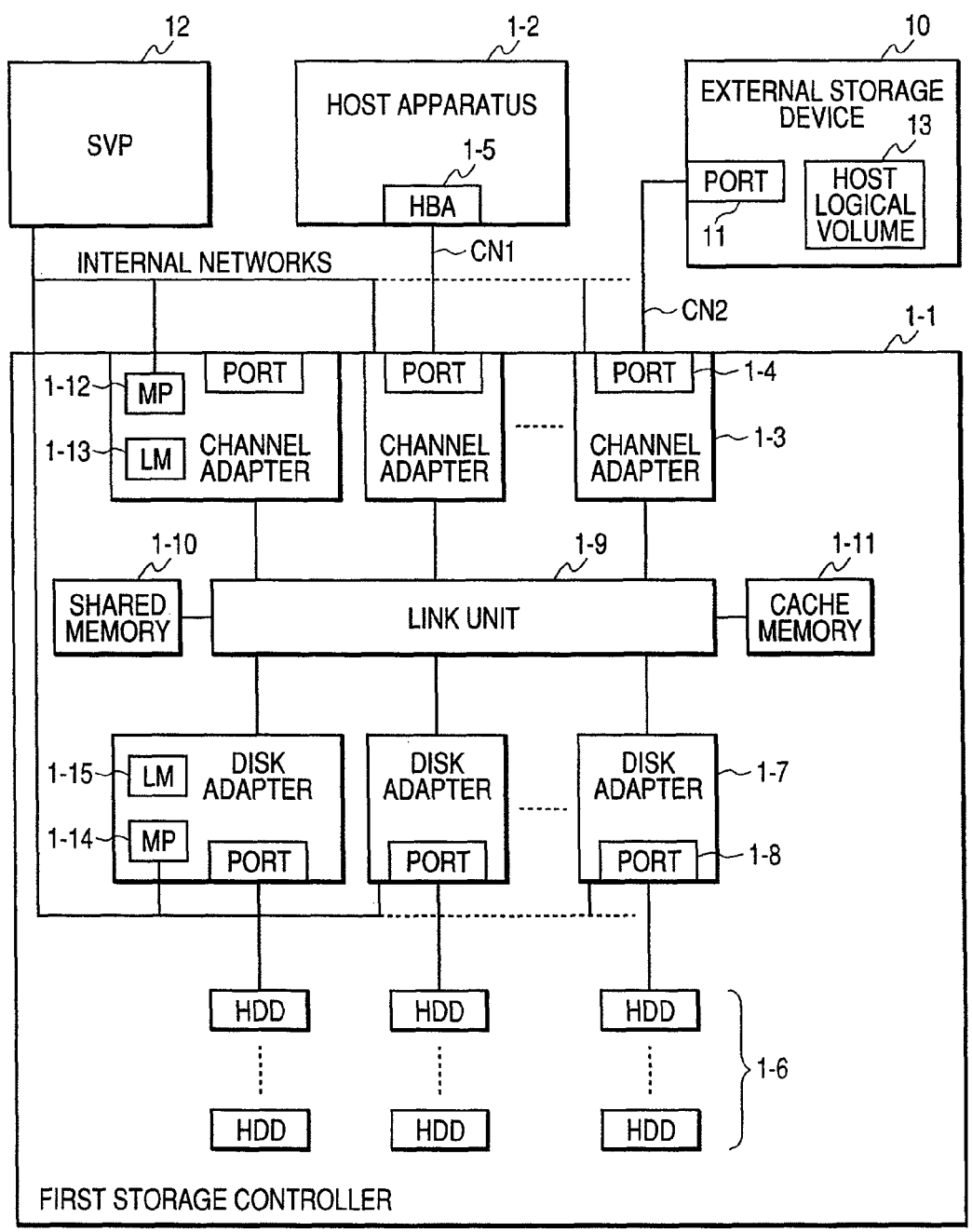
FIG. 1 is a block diagram showing an example of the hardware configuration of a storage controller according to an embodiment of the present invention.

FIG. 1 shows an example of the configuration of a storage control system. The reference numeral 1-1 denotes a first storage controller, and the reference numeral 1-2 denotes a host apparatus operating as a host system which is connected to the first storage controller 1-1. The host apparatus 1-2 is a computer apparatus having information processing resources, such as a CPU (Central Processing Unit) or memory, for example, and it is constituted by a personal computer, a workstation, or a main frame. The host apparatus has an information input device, such as a keyboard switch, a pointing device, or a microphone, and an information output device, such as a monitor display unit or a speaker.

In addition, the host apparatus has, for example, database software which uses storage areas provided by the first storage controller 1-1, an application program, such as archive software, which uses storage areas provided by a second storage controller (external storage controller) 10, and an HBA (Host Bus Adapter) 1-5 for providing access to the first storage controller through a communication network CN1. On the first storage controller 1-1, a plurality of channel adapters 1-3 are mounted. Each channel adapter 1-3 has a port 1-4 and is connected to the HBA 1-5 mounted on the host apparatus via the port 1-4, for example, using a fiber channel CN1. As the communication network CN1, a LAN (Local Area Network), a SAN (Storage Area Network), the Internet, a lease line, or a PSTN (Public Switched Telephone Network) can be used, if necessary. Data transmissions through the LAN are performed, for example, according to TCP/IP (Transmission Control Protocol/Internet Protocol) protocol.

When the host apparatus 1-2 is connected to the first storage controller 1-1 via the LAN, the host apparatus designates file names and requests data input/output of a file unit. On the other hand, when the host apparatus is connected to the first storage controller via a SAN, the host apparatus requests data input/output of a block unit according to a fiber channel protocol, in which the block is a unit of data management on storage areas provided by a plurality of disk storage apparatuses (disk drives).

If the communication network CN1 is a LAN, the adapter 1-5 is a network card corresponding to the LAN, for example. If the communication network is a SAN, the adapter 1-5 is a host bus adapter, for example. The host apparatus 1-2 and the storage controller 1-1 perform data transfer according to the fiber channel protocol. Further, when the host apparatus 1-2 is a main frame, data transfer is performed according to a communication protocol, such as FICON (Fibre Connection) (Registered Trademark), ESCON (Enterprise System Connection) (Registered Trademark), ACONARC (Advanced Connection Architecture) (Registered Trademark), or FIBARC (Fibre Connection Architecture) (Registered Trademark). The first storage controller 1-1 is constituted, for example, by a disk array subsystem, but the invention is not limited to that. Alternatively, the first storage controller 1-1 may be constituted by a high-functional intelligent fiber channel switch.

On the first storage controller 1-1, a plurality of HDDs (Hard Disk Drives) 1-6 operating as memory mediums and a plurality of disk adapters 1-7 for respectively controlling the plurality of HDDs 1-6 are mounted. Each disk adapter 1-7 has a port 1-8 for connecting to a HDD, and, thus, each disk adapter is respectively connected to a plurality of HDDs 1-6. The ports 1-8 and the plurality of HDDs 1-6 are connected to each other through FC-AL (Fiber Channel-Arbitrated Loop) or a fabric of the fiber channel, or a parallel SCSI, respectively.

The channel adapter 1-3 and the disk adapter 1-7 are connected to each other through a link unit 1-9. Further, to the link unit 1-9, a shared memory 1-10 and a cache memory 1-11 are also connected. On the channel adapter 1-3 and the disk adapter 1-7, microprocessors (NP) 1-12 and 1-14 and local memories (LM) 1-13 and 1-15 which pair up with them are mounted, respectively. On the microprocessor 1-12 of the channel adapter 1-3, a program which processes commands transferred from the host apparatus 1-2 is executed. On the microprocessor 1-14 of the disk adapter 1-7, a program for controlling the plurality of HDDs 1-6 is executed. The programs are respectively operating with the local memories. In order to perform cooperative processes between the plurality of channel adapters 1-3 and the plurality of disk adapters 1-7, control information which is needed to be shared therebetween is located in the shared memory 1-10. The microprocessor 1-12 of each channel adapter 1-3 and the microprocessor 1-14 of each disk adapter 1-7 can access control information in the shared memory through the link unit 1-9.

The channel adapter 1-3 receives commands, such as a data read/write request and data from the linked host apparatus 1-2, and analyzes various commands which it is to execute. To the channel adapters 1-3, network addresses (for example, IP addresses or WWN (World Wide Name)) for identifying each channel adapter are allocated, respectively. The respective channel adapters 1-3 may have a function of acting as an NAS (Network Attached Storage). If a plurality of host apparatuses 1-2 exist, the respective channel adapters 1-3 can receive requests individually from the host apparatuses 1-2.

Upon receiving a data read request from the host apparatus 1-2, the channel adapter 1-3 stores the read command in the shared memory 1-10. The disk adapter 1-7 refers to the shared memory 1-10 at any time to detect an unprocessed read command. If an unprocessed read command is detected, the disk adapter 1-7 reads data from the HDD 1-6 serving as a storage device and stores the data in the cache memory 1-11. The channel adapter 1-3 reads data which is migrated to the cache memory 1-11 and transmits the data to the host apparatus 1-2, which is a command source. Upon receiving a data write request from the host apparatus 1-2, the channel adapter 1-3 stores the write command in the shared memory 1-10 and also stores received data in the cache memory 1-11.

The disk adapter 1-7 stores data, which is stored in the cache memory 1-11, in the predetermined storage device 1-6 according to the command stored in the shared memory 1-10. When performing data input/output operations to and from the storage device, each disk adapter 1-7 converts a logical address into a physical address. When the storage device 1-6 is managed according to RAID, each disk adapter 1-7 performs data access according to the RAID configuration. Each disk adapter 1-7 and each storage device 1-6 are connected to each other through the communication network, such as a SAN, and perform data transfer of the block unit according to the fiber channel protocol. Each disk adapter 1-7 monitors the status of the storage device 1-6 at any time and transmits the monitoring result to a SVP (service processor) 12 through an internal network 3 (LAN).

In addition to the data read and write commands, the channel adapter 1-3 analyzes and processes commands for power supply control of storage resources of the external storage controller (second storage controller) 10 and access controls (attribute controls of logical volumes) from the host apparatus to logical volumes of the first and/or second storage controllers, as will be described below.

The SVP 12 is a computer apparatus for performing management and monitoring of the first storage controller 1-1. The SVP 12 collects various environment information or performance information from each channel adapter 1-3, each disk adapter 1-7 and the like through the communication network which is provided within the first storage controller 1-1. As information which is collected by the SVP 12, for example, device configurations, power supply alarms, temperature alarms, or input/output speeds (IOPS) are exemplified. The communication network is constructed by a LAN, for example. A system administrator can perform the setup of the RAID configuration and blocking processes of various packages (channel adapters, disk adapters, disk drives, and so on) through a user interface which is provided by the SVP 12.

The cache memory 1-11 is used to temporarily hold data which the host apparatus 1-2 accesses. The cache memory 1-11 is accessible at a higher speed than the HDD 1-6, and, thus, it contributes to enhancement of the access performance of the storage controller (in particular, the response performance to a command). Further, in the shared memory 1-10, a work area is set up, and various tables, such as a mapping table Tm to be described below, are also stored. Moreover, one or more HDDs 1-6 may be used as a disk for the cache.

The link unit 1-9 connects each channel adapter 1-3, each disk adapter 1-7, the cache memory 1-11 and the shared memory 1-10 to each other. The link unit 1-9 may be constituted by a high-speed bus, such as a very high-speed crossbar switch, which performs data transfer by high speed switching operations.

The channel adapter 1-3 of the first storage controller 1-1 is connected to the external storage controller (second storage controller) 10 through a communication network CN2 and a communication port 11. The external storage controller 10 maybe constituted by a disk array device having HDDs. Besides, the external storage controller 10 may have a channel adapter or a disk adapter. A storage device 13 of the external storage controller 10 is mapped so as to be treated as an internal storage device of the first storage controller 1-1.

Figure 2:
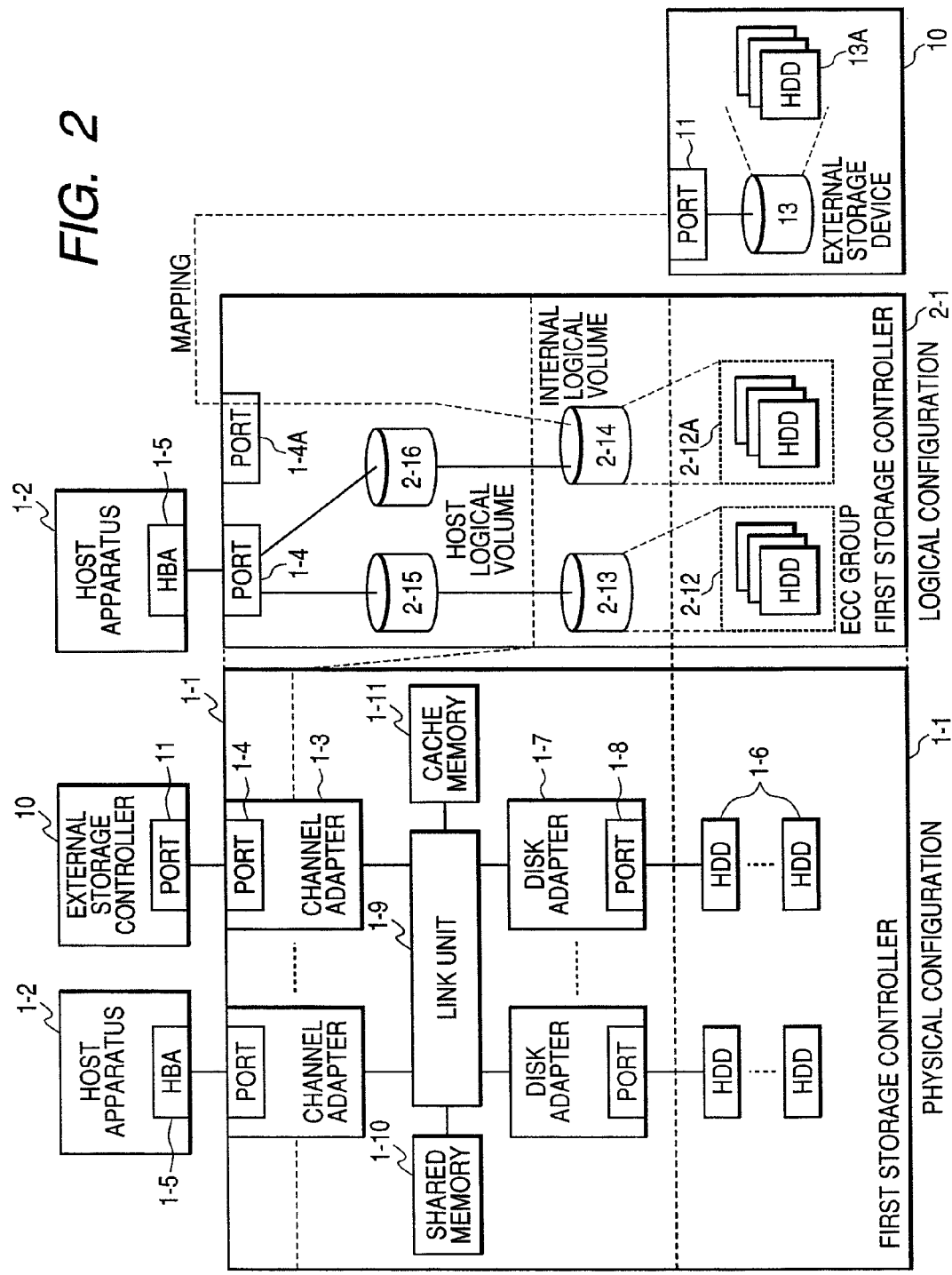
FIG. 2 is a block diagram showing an example of correspondence relationships between a hardware configuration and a logical configuration of the storage controller according to the embodiment of the invention.

The left side of FIG. 2 shows the physical configuration of the storage controller 1-1 shown in FIG. 1, and the right side thereof shows a logical configuration of the storage controller 1-1. That is, FIG. 2 shows the correspondence relationship between the physical configuration and the logical configuration of the storage controller 1-1.

An ECC (Error Check & Correction) group 2-12 is formed with a group of several HDDs from the plurality of HDDs 1-6. The ECC group is constructed by the RAID and protects stored data from a single point failure of the HDD in the ECC group. A storage area formed by the ECC group is divided into one or more areas to define logical volumes. In an example of FIG. 2, the storage area of the storage device made of the plurality of HDDs 1-6 is divided into two areas 2-12 and 2-12A, and internal logical volumes 2-13 and 2-14 correspond to the divided areas, respectively. The internal logical volumes 2-13 and 2-14 are data storage areas of the HDD which are provided to the host apparatus 1-2 by the programs, which are executed on the microprocessor 1-12 in the channel adapter 1-3 and the microprocessor 1-14 in the disk adapter 1-7 of FIG. 1.

In order for the host apparatus 1-2 to read/write data from and to the first storage controller 1-1, it is required that the host apparatus 1-2 be able to recognize host logical volumes 2-15 and 2-16, which are provided by the first storage controller 1-1. The host logical volumes 2-15 and 2-16 are subject to accesses of the host apparatus provided by the program, which is executed on the microprocessor (1-12 of FIG. 1) of the channel adapter 1-3, to the host apparatus 1-2. For example, an LU (Logical Unit) in the fiber channel or SCSI corresponds to the host logical volume.

The host logical volumes 2-15 and 2-16 themselves are virtual devices which do not have actual storage areas. The host logical volumes and the internal logical volumes are associated with each other on a one to one basis through an association switching control to be described below. The associations between the host logical volumes and the internal logical volumes are stored as configuration information in the shared memory 1-10 and are managed by the program which is executed on the microprocessor (1-12 of FIG. 1) of the channel adapter 1-3.

Data which is written into the host logical volumes 2-15 and 2-16 from the host apparatus 1-2 is written into the internal logical volumes, which have actual storage areas, according to the associations between the host logical volumes and the internal logical volumes 2-13 and 2-14. That is, data which is written into a head logical block of the host logical volume 2-15 through the port 1-4 by the host apparatus 1-2 is actually written into a head logical block of the internal logical volume 2-13. In short, data which is written into a predetermined logical block of the host logical volume 2-16 through the port 1-4 by the host apparatus 1-2 is actually written into a corresponding logical block of the internal logical volume 2-14.

A host logical volume 13 (see FIG. 1) of the storage device of the external storage controller 10 is mapped in the internal logical volume 2-14, and the host logical volume 13 is recognized as an internal device of the first storage controller 1-1 by the host apparatus 1-2. Information for mapping is recorded in the mapping table described below. As a mapping method, virtual logical devices (VDEV) may be provided between the internal logical volumes of the first storage controller 1-1 and the physical areas of the HDDs and intermediate virtual devices maybe mapped in external devices. The VDEV is a virtual device which is located at a lowermost level of a logical storage level. The VDEV is constructed by virtualizing a physical storage resource, to which the RAID configuration may be applied. That is, a plurality of VDEVs may be formed with one storage device, or one VDEV may be formed with a plurality of storage devices.

To a communication port 11, corresponding to the logical volume 13 of the external storage controller 10, the WWN which constitutes unique identification information is allocated. Further, in the logical volume 13 of the external storage controller 10, an LUN (logical unit number) is set up. Thus, through the combination of the WWN and the LUN, the logical volume 13 of the external storage controller 10 can be recognized as an internal device by the host apparatus 1-2.

Next, operations of the above-mentioned storage control system will be described in detail. First, an example of a relationship between the first storage controller 1-1 and the second storage controller 10 will be described. The HDDs 1-6 of the first storage controller 1-1 are assumed to be constantly used as the storage area of the host apparatus 1-2 operating as a server, and thus they are designed to be operated all day. To the contrary, when the external storage controller 10 is used for backup, restore, or archive, it is difficult to consider that access to the HDD serving as the memory medium will constantly occur. For example, for backup/restore, only when backup is acquired will data write to the external storage controller, and only once or several times a day, conventionally; and, only when restore is rarely made will data read from the external storage controller occur. Further, for archive, when acquiring archive, data write to the external storage controller occurs, and when referring to archived data, data read from the external storage controller rarely occurs.

As such, when the external storage controller is used for backup/restore or archive, access to data of the storage device does not frequently occur. Thus, when it is clearly understood that access to data does not apparently occur, it is effective to stop the spindle motor of the HDD in which the data is stored. Therefore, a low-priced HDD having moderate performance and reliability, which uses the S-ATA (serial ATA) as a link interface, can be used for the storage device 13A of the external storage controller 10. In the HDD which uses the S-ATA as the link interface, an MTBF (Mean Time Between Failure), which is one of reliability indexes of the HDD, is generally designed to be short as compared to an HDD which uses a fiber channel as the link interface. In this case, when the spindle motor of the HDD which uses the S-ATA as the link interface constantly rotates so as to operate all day, a failure is likely as compared to the HDD which uses the fiber channel as the link interface. As a result, when access to the storage device 13A of the external storage controller 10 from the host apparatus 1-2 is absent, it is preferable to stop the HDD which uses the S-ATA as the link interface, and only when access is present it preferable to rotate the HDD.

That is, the first storage controller 1-1 may use a high-speed, high-performance and high-reliable device, such as the fiber channel, as the link interface of the storage device (HDD), while the second storage controller 10 may use a low-speed, low-performance and low-reliable device, such as the S-ATA as the link interface of the storage device (HDD). As described below, in the storage control system according to the invention, a plurality of second storage controllers 10 may be connected to the first storage controller 1-1. Further, a third storage controller may be connected to the first storage controller. Here, as the third storage controller, one having a low-speed, low-performance and low-reliable storage device (for example, a tape device) may be used, as compared to the second storage controller.

Figure 3:
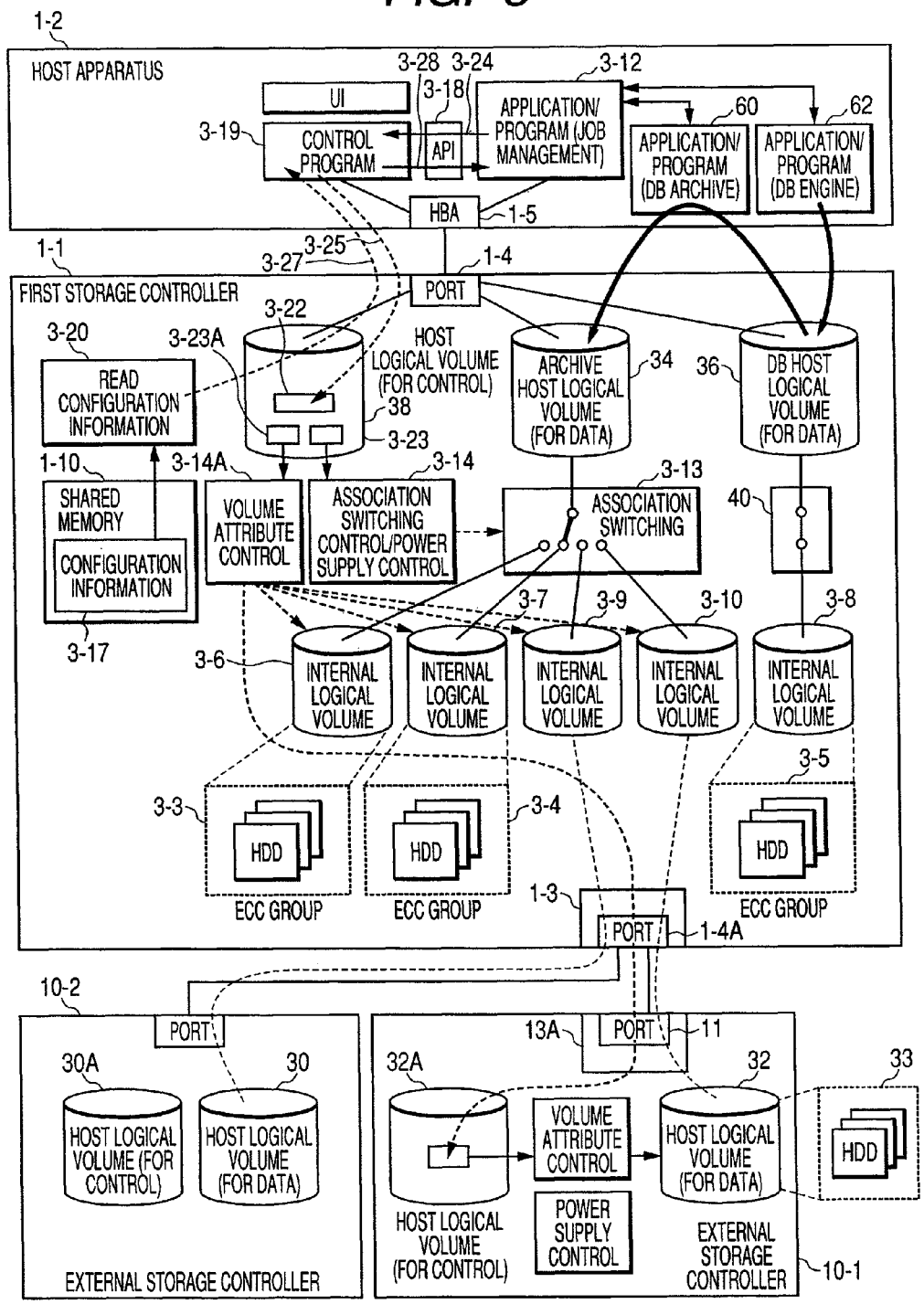
FIG. 3 is a block diagram showing details of the logical configuration of the storage controller according to the embodiment of the invention.

FIG. 3 is a logical block diagram illustrating a logical structure of the first storage controller 1-1, which is shown on the right side of FIG. 2 in detail. To the first storage controller 1-1, two storage controllers 10-1 and 10-2 are respectively connected as the second storage controller. As an internal storage device of the first storage controller 1-1, three ECC groups 3-3 to 3-5, each being grouped with a plurality of HDDs, are provided. Three internal logical volumes 3-6 to 3-8 are respectively provided in correspondence to the storage areas of the three ECC groups 3-3 to 3-5. The internal logical volume 3-6 is defined in the ECC group 3-3, the internal logical volume 3-7 is defined in the ECC group 3-4, and the internal logical volume 3-8 is defined in the ECC group 3-5.

An internal logical volume 3-9 is mapped in a host logical volume 30 in the external storage controller 10-2 serving as one second storage controller, and an internal logical volume 3-10 is mapped in a host logical volume 32 in the external storage controller 10-1 serving as the other second storage controller.

The first storage controller 1-1 has two kinds of host logical volumes. The first kind of the host logical volumes (for data) 34 and 36 are subject to access from the host apparatus 1-2 and are used as an access destination when data for an application program (database (DB) archiver 60 or database (DB) engine 62) in the host apparatus 1-2 is written and read. As for the host logical volume, it may be defined according to the kind of the application. As described above, in the example of FIG. 3, there are an archive host logical volume and a database host logical volume.

The second type of the host logical volume is a host logical volume (for control) 38. This logical volume serves as an access destination for the control command of the microprocessor 1-12 in the channel adapter 1-3 shown in FIG. 2. Details thereof will be described later.

The application program (job management) 3-12 of the host apparatus 1-2 allows the host apparatus 1-2 to serve as the archive server and the database engine. When the host apparatus 1-2 serves as the archive server, the host apparatus 1-2 can access the archive host logical volume 34; while, when the host apparatus 1-2 serves as the database engine, the host apparatus 1-2 can access the database host logical volume.

HDDs constituting the ECC group, which is located below the internal logical volumes 3-6, 3-7, 3-9, and 3-10 that are mapped in the archive host logical volume (for data), may use the S-ATA as the link interface. The internal logical volumes 3-6 and 3-7 correspond to internal HDDs of the first storage controller 1-1, the internal logical volume 3-9 corresponds to an HDD of the external storage controller 10-1, and the internal logical volume 3-10 corresponds to an HDD of the external storage controller 10-2. Between the archive host logical volume (for data) 34 and the four internal logical volumes 3-6, 3-7, 3-9, and 3-10, an association switching unit 3-13 is provided. The association switching unit 3-13 switches the associations between the host logical volume (for data) 34 and the internal logical volumes 3-6, 3-7, 3-9, and 3-10 based on commands from an association switching control unit 3-14.

Moreover, in the above-mentioned embodiment, the control unit represents the microprocessor 1-12 of the channel adapter of the first storage controller and the control host logical volume 38. In addition, the control unit may represent the microprocessor of the channel adapter of the external storage controller and control host logical volumes (30A and 32A).

Figure 4:
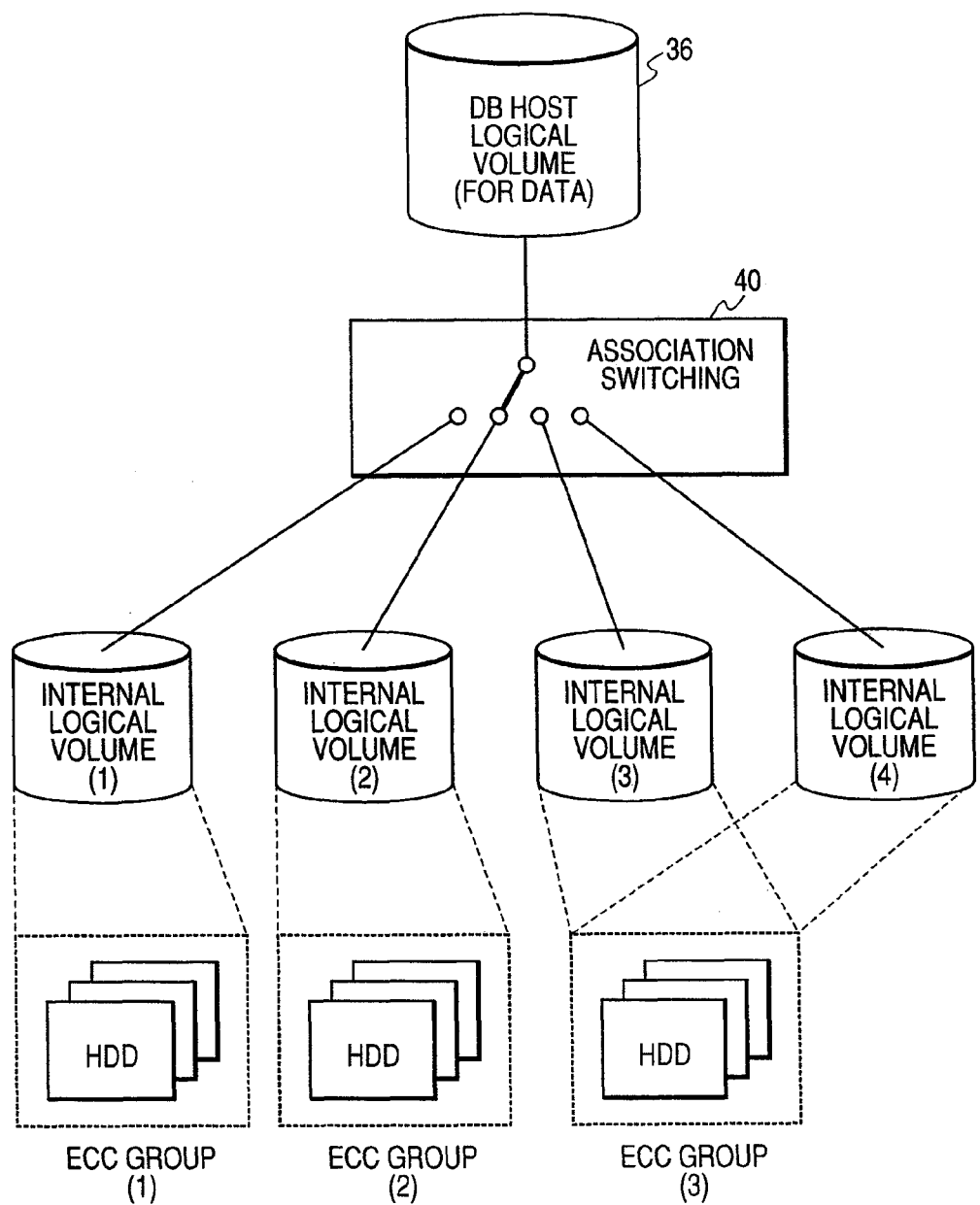
FIG. 4 is a block diagram showing details of the configuration of a portion (internal logical volumes corresponding to a database host logical volume) in FIG. 3.

The configuration of the database host logical volume 36 is shown in FIG. 4 in detail. In this logical volume, ECC groups (1) to (3), represented by internal devices of the storage controller 1-1, (these are collectively shown in FIG. 3 as the ECC group 3-5) correspond to internal logical volumes (1) to (4) (these are collectively shown in FIG. 3 as the internal logical volume 3-8), respectively. Between the internal logical volumes and the host logical volume, the same mechanism 40 as the association switching mechanism for the archive host logical volume is provided.

As described above, the associations between the host logical volume and the internal logical volumes are managed by the program which is executed on the microprocessor in the channel adapter. Therefore, the association switching unit 3-13 and the association switching control unit 3-14 are also implemented by this program. For example, when the host logical volume (for data) 34 is associated with the internal logical volume 3-10, data which is written into the memory area of the cache memory 1-11, to which the host logical volume (for data) 3-10 corresponds, through the HBA 1-5 from the host apparatus 1-2, is written into the memory area corresponding to the host logical volume 32 of the external storage controller 10-1 through the port 1-4A and the port 11.

Data is written into the HDDs constituting the ECC group which corresponds to the host logical volume 32. Therefore, the application program (DB archiver) 60 serving as the archive server can access the host logical volume 32 of the external storage controller 10-1 as an internal device, and, further, it can write data for archive into the storage device of the external storage controller 10-1 and read archive data written into the storage device.

In a portion of the shared memory 1-10 (see FIGS. 1 and 2) in the first storage controller 1-1, configuration information 3-17 which includes the physical configuration of the storage controller is stored. As configuration information, a mapping table is included in which the correspondence between the number of the host logical volume, as exemplarily shown in FIG. 5, and the number of the internal logical volume associated with the host logical volume is held. The host logical volume and the internal logical volumes of the first storage controller, the host logical volume of the external storage controller, and correspondence relationships between them are previously set up by the control program 3-19 (see FIG. 3) in the host apparatus 1-2 and a service processor 12. The processor 1-12 (see FIG. 1) of the channel adapter 1-3 can determine the internal logical volume corresponding to the host logical volume by referring to the table. The table is updated by the association switching control unit 3-14 (see FIG. 3) between the host logical volume and the internal logical volumes.

FIG. 6 shows a mapping table between the internal logical volumes and the ECC group and the logical volume in the external storage controller corresponding to the internal logical volumes. In the table of FIG. 6, a variety of identification information is stored for every internal logical volume. 'Internal' of device identification information represents the storage device being a device in the first storage controller. CCCCC, DDDDD, EEEEE, and FFFFF represent the storage devices which are devices in the external storage controller, respectively. In the identification information, header information or the like is included. The processor of the channel adapter may determine whether or not the external storage controller can exchange control information with the first storage controller from the device CCCCC and the like; and, based on the result, it may set up a flag, which indicates whether power supply control or access control to be described below is performable, in the table of FIG. 6.

Capacity represents a storage capacity of the HDD constituting each ECC group or the logical volume in the external storage controller. Device type serves to classify whether the storage device is a disk type or a tape type. The disk type storage devices are further classified. That is, they are further divided into the HDD type which uses a fiber channel as the link interface or the HDD type which uses the S-ATA as the link interface. Internal/external represent whether the storage device is an internal device of the first storage controller or a device of the external storage controller. Protection designation represents whether or not device attributes (access controls) can be designated and includes read prohibition or write prohibition of the HDD. The details thereof will be described below. Power supply control is an attribute indicating whether or not power supply control of a driving unit (a spindle motor of the HDD) of the storage device is possible. As described above, when the external storage controller can not exchange information with the first storage controller, and when the external storage controller can not exchange control commands with the first storage controller, the power supply control of the driving unit of the second storage controller from the first storage controller can not be performed. WWN in path information means an identifier of a port at the external storage controller side, and LUN means the number of the logical volume within the port. 'Internal' in path information means an internal device which does not have an identifier of a port of the external storage controller that is accessed by the first storage controller. Further, in the table of FIG. 6, the latest update date of each logical volume is recorded.

Figure 7:
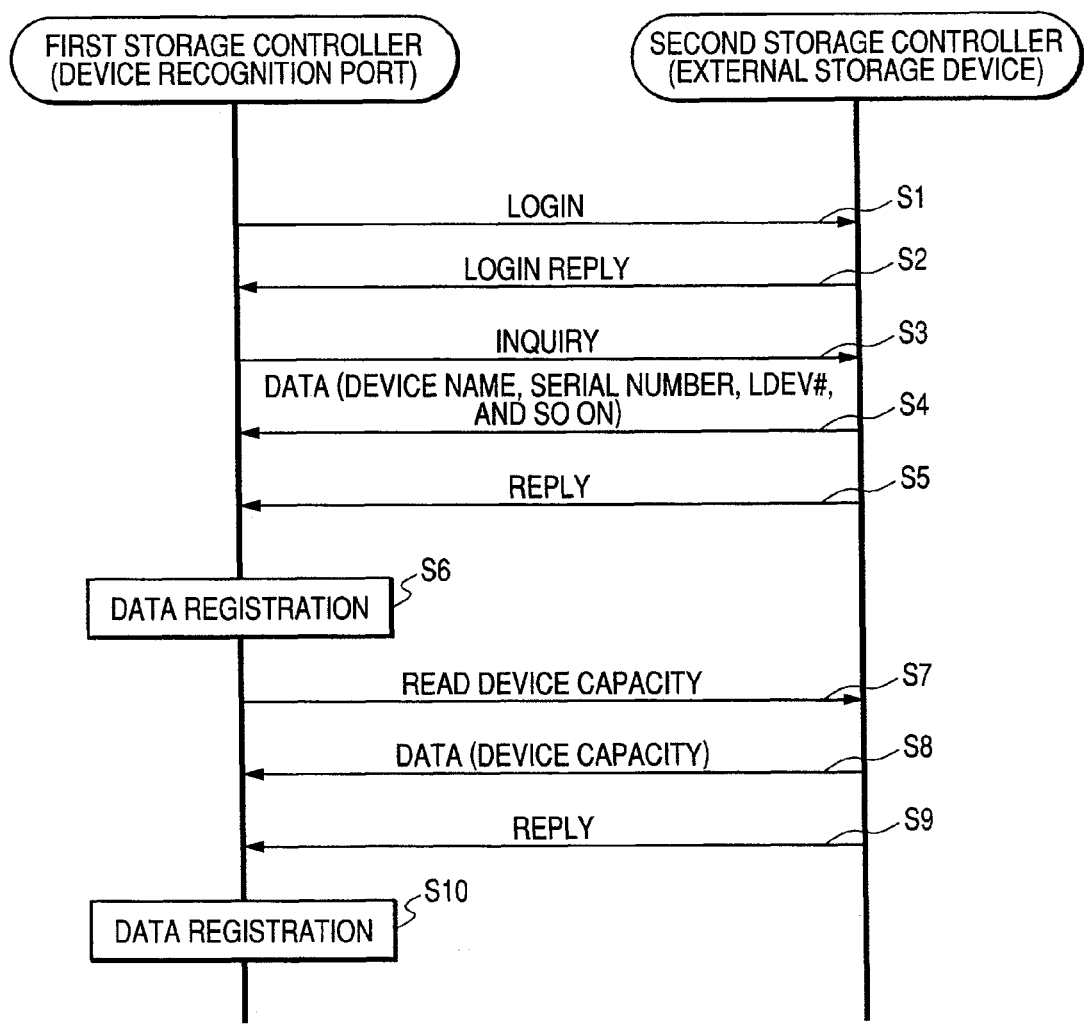
FIG. 7 is a diagram showing a process flow which constructs a mapping table.

Next, mapping between the internal logical volume and the ECC group corresponding to the internal logical volume will be described. Herein, a description will be given on an assumption that the host logical volume 32 of the external storage controller (10-1 in FIG. 3) is mapped in the internal logical volume 3-10 of the first storage controller 1-1. FIG. 7 is a diagram illustrating operations for generating the mapping table described above.

First, as shown in FIG. 3, the first storage controller 1-1 logs into the second storage controller 10-1 through the port 1-4A of the channel, adapter 1-3 and the port 11 (S1). The second storage controller 10-1 returns a response to the login of the first storage controller 1-1, and thus the login process is completed (S2). Next, the first storage controller 1-1 transmits an inquiry command, which is determined with the SCSI (Small Computer System Interface) standard, to the second storage controller 10-1 and requests a response to the details of a storage device which is included in the second storage controller 10-1 (S3) using an inquiry command.

The inquiry command is used to clear the type and configuration of an inquiry destination device and can permeate the level of the inquiry destination device to grasp the physical structure thereof. By using the inquiry command, the first storage controller 1-1 can acquire information, such as the device name, the device type, the serial number (product ID), the internal logical volume number, a variety of version information, or the header ID, from the second storage controller 10-1 (S4). The information is recorded into a memory in a table form as shown in FIG. 6, as will be described below. The table of FIG. 6 shows a portion of the information. The second storage controller 10-1 transmits inquired information to the first storage controller 1-1 and replies to the inquiry command (S5).

The first storage controller 1-1 registers information acquired from the second storage controller 10-1 into predetermined locations of the mapping table shown in FIG. 6 (S6). Next, the first storage controller 1-1 reads the storage capacity of the storage device from the second storage controller 10-1 (S7). For the inquiry of the first storage controller 1-1, the second storage controller 10-1 answers the storage capacity of the storage device 33 (S8) and returns a response (S9). The first storage controller 1-1 registers the storage capacity of the storage device 33 into a predetermined location of the mapping table (S10). The table is recorded into the shared memory 1-10 as configuration information 3-17.

Next, with reference to FIG. 3, the association switching between the host logical volume and the internal logical volumes in the storage controller 1-1 will be described. The application program 3-12 in the host apparatus 1-2 issues a command and reads in 1) the configuration of the host logical volume, 2) the configurations of the internal logical volumes, 3) the correspondence relationships of the host logical volume and the internal logical volumes from configuration information 3-17 in the storage controller 1-1. In this case, as described above, the tables of FIGS. 5 and 6 are referred to. This is performed by the application program 3-12 as occasion arises. For example, this is performed when the application program 3-12 starts or when an operator of the application program 3-12 knows that the physical configuration or logical configuration of the first storage controller 1-1 changes.

Based on the configuration information of the storage controller 1-1 read in the application program 3-12, the application program 3-12 performs association switching between the host logical volume and the internal logical volumes. The details thereof are as follows. The application program 3-12, which is executed on the host apparatus 1-2, accesses an API (Application Program Interface) 3-18 so as to read in configuration information 3-17 of the first storage controller 1-1. The API 3-18 is implemented by the control program 3-19, which is similarly executed on the host apparatus 1-2.

The control program 3-19 is a program which has a function of issuing the read command of configuration information 3-17 to a configuration information read unit 3-20 and a function of the association switching command between the host logical volume and the internal logical volumes to the association switching control unit 3-14. The control program 3-19 accesses another host logical volume (for control) 38 in the storage controller 1-1 through the HBA 1-5 and the port 1-4. The host logical volume (for control) 38 is used not to store data of the application program (archive/database), but to perform the control of the storage controller 1-1. Here, the control means the function of reading configuration information 3-17 or the function of switching the associations between the host logical volume and the internal logical volumes. The switching is performed based on the mapping table described above.

Here, a specified aspect of the association switching will be described. The determination of the association switching is performed by the first storage controller 1-1 or the host apparatus 1-2 (see FIG. 3), or by both in cooperation. The association switching control unit 3-14 of the host logical volume (for control) 38 of the first storage controller 1-1 performs association switching with reference to the table of FIG. 6, which is obtained from configuration information 3-17. The host apparatus 1-2 reads and creates table information of FIG. 6 from configuration information 3-17 (see FIG. 3) of the first storage controller 1-1, so as to implement the switching, and stores it in a predetermined storage area of the host apparatus.

If the host apparatus 1-2 switches the association, the table of FIG. 6 is created by the host apparatus as described above, for example, when the database archiver 60 is started. And then, the internal logical volume corresponding to the host logical volume, for example, one having vacant data capacity, though not used, is selected first of all. When the update date in the table is NULL, it represents an unused internal logical volume. In the case of archive, the control program 3-19 becomes vacant, and first selects the internal logical volume which is constructed by the S-ATA. Alternatively, the internal logical volumes may be selected in a sequence from the old update date. The setup for what rule is applied to the selection of the internal logical volume is recorded into the job management program 3-12 of the host apparatus 1-2.

Moreover, in order to record the update date of the internal logical volume, the first storage controller 1-1 has a timer function. When the control program 3-19 creates the control table (see FIG. 6), the control program 3-19 can acquire the latest update date or update history for every internal logical volume by using past time data in the timer function.

An example in which the first storage controller 1-1 determines the association switching will be described. In this case, the table of FIG. 6 is constructed so as to be stored in the shared memory of the first storage controller 1-1.

As to the switching timing, a case in which the host apparatus 1-2 instructs the first storage controller to backup data (electronic mail) will be exemplified. When the capacity of the internal logical volume associated with the host logical volume is almost full, the internal logical volume as the data storage destination is newly determined with reference to the table of FIG. 6, and the internal logical volume which currently corresponds to the host logical volume 34 is switched into the newly determined internal logical volume. At the time of archive of electronic mail, the internal logical volume is switched such that the electronic mail on Monday is stored in the internal logical volume corresponding to Monday. At this time, if the HDDs constituting the internal logical volumes corresponding to Tuesday to Sunday are powered off, as will be described below, there is no case in which the durability of the HDD corresponding to each internal logical volume is lowered.

In the following description, the association switching between the host logical volume and the internal logical volumes is performed as the example described above, and so, hereinafter, the description thereof will be omitted.

The host logical volume (for control) 38 is divided into a plurality of areas. And then, a specific function is determined for every area. For example, an area 3-22 is an area which is used for the function of reading configuration information 3-17. If the host apparatus 1-2, specifically, the control program 3-19, reads a logical block which is allocated in the area 3-22, it can be seen that configuration information 3-17 is included in that block.

Further, for example, an area 3-23 is an area which is used for the function of switching the association between the host logical volume and the internal logical volumes. If the control program 3-19 writes required information in a logical block which is allocated in the area 3-23, the association between the host logical volume and the internal logical volumes can be switched.

By switching the archive host logical volume 34 into the host logical volume 32 of the external storage controller 10-1, the database archiver 60 of the host apparatus 1-2 can access the host logical volume of the specific external storage controller.

In a physical area to which the host logical volume (for control) 32A of the external storage controller 10-1 corresponds, the control command to the host logical volume (for data) 32 is stored. The processor in the external storage controller 10-1, for example, the processor 1-12 (see FIG. 1) of the channel adapter to which the first storage controller is connected can analyze and perform the control command recorded in the host logical volume 32A of the second storage controller 10-1 and control the storage device 33 corresponding to the host logical volume 32 of the second storage controller 10-1. Like the first storage controller 1-1, the host logical volume of the external storage controller 10-1 is constructed by the data host logical volume 32 and the control logical volume 32A described above.

The processor 1-12 (see FIG. 1) of the channel adapter 1-3 refers to the table of FIG. 6. And then, if the external storage controller 10-1 determines that the control command of the first storage controller 1-1 is a recognizable type, the processor 1-12 transmits the control command to the host logical volume (for control) 32A of the external storage controller 10-1 through the ports 1-4A and 13 and a communication path (fiber channel) between them, under the control of the command which is stored in the area 3-23A of the host logical volume (for control) 38.

Hereinafter, the current application control of the HDD, which follows the switching between the host logical volume and the internal logical volumes, will be described in detail. The application program 3-12, which is executed on the host apparatus 1-2, calls the API 3-18 so as to read configuration information 3-17 of the first storage controller 1-1 (3-24) If the API 3-18 is called, the control program 3-19 which is similarly executed on the host apparatus 1-2 recognizes that the read of configuration information 3-17 is instructed. And then, the control program 3-19 issues a command to read the area 3-22, which is used for the function of reading configuration information 3-17 in the host logical volume (for control) 38 to the host logical volume (for control) 38 through the HBA 1-5 and the port 1-4 (see 3-25 in FIG. 3).

Figure 8:
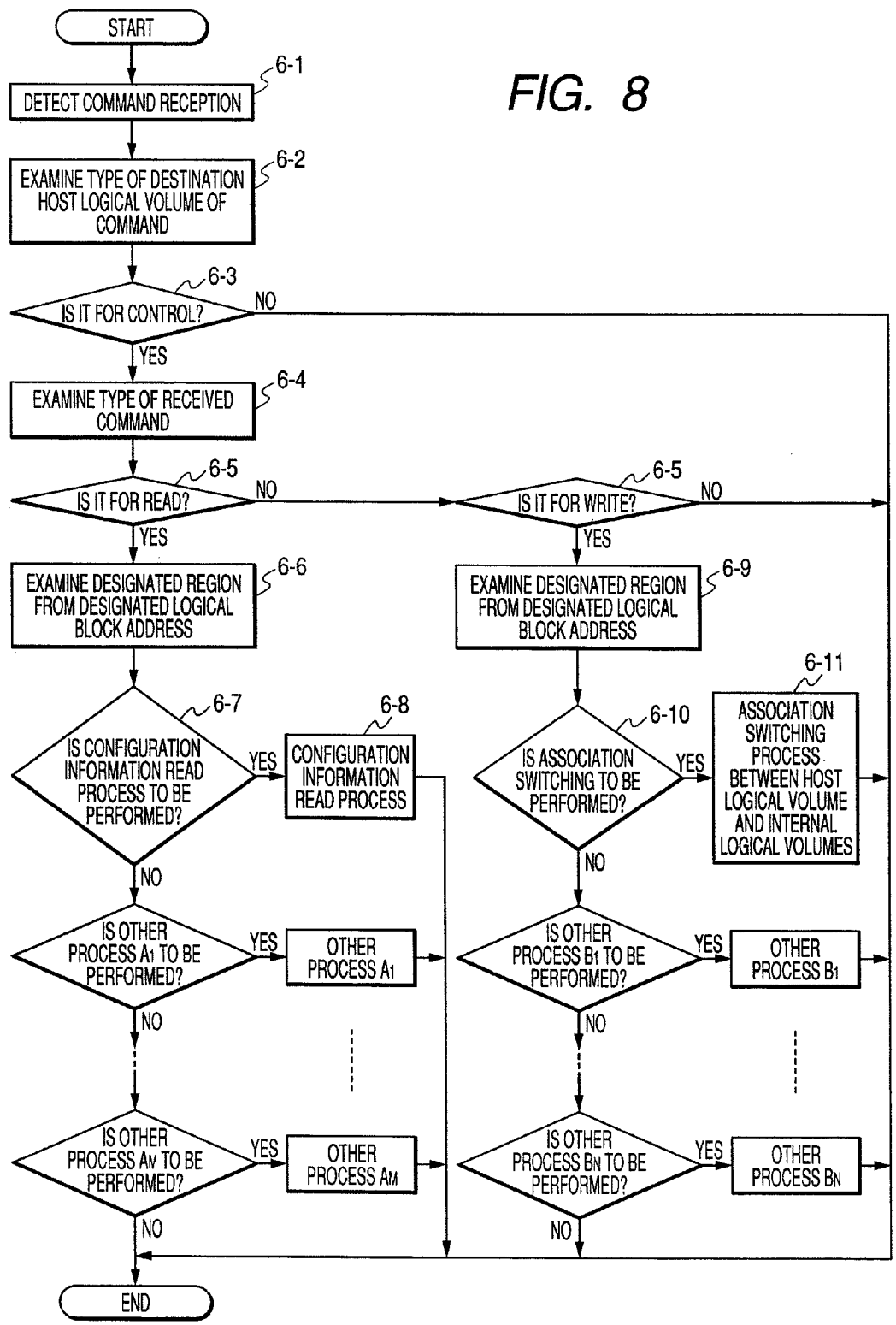
FIG. 8 is a flowchart showing association switching between the host logical volume and the internal logical volumes.

The command received by the channel adapter is processed in the program which is executed on the microprocessor 1-12 (see FIG. 1) of the channel adapter 1-3. Whenever the command is received from the host apparatus 1-2, the channel adapter operates based on a flowchart, as shown in FIG. 8. To begin with, the reception of the command is detected (6-1). Next, the channel adapter examines the type (for control/for data) of the host logical volume (6-2). This is performed by examining configuration information of the host logical volume, which is held in configuration information 3-17, with the number of the host logical volume included in the command. In configuration information 3-17, the number of the host logical volume and the table, in which the flag for discriminating whether the host logical volume is for control or for data is set, are stored.

As a result, the channel adapter can identify whether the host logical volume is for control or for data (6-3). If the command to the host logical volume (for control) 38 is issued, it is judged that the host logical volume is 'for control'. Next, the channel adapter examines the type of command (read/write/others) (6-4). This is performed by examining a command code included in the command. As a result, the channel adapter can identify whether the type of command is read, write, or others (6-5). If the command to read the area 3-22 in the host logical volume (for control) 38 is issued, it is judged that the type of command is 'read'.

Next, the channel adapter examines to which area of the host logical volume (for control) 38 the read operation is to be performed (6-6). This is performed by examining the number of the logical block included in the command. As a result, the process to be performed can be seen (6-7). If the area 3-22 allocated to the function of reading the configuration information 3-17 is designated, it is judged that the process to be performed is 'read of configuration information 3-17'. And then, the channel adapter performs the configuration information read process 6-8.

The configuration information read process 6-8 is performed by the configuration information read unit 3-20, which is the portion of the program executed on the microprocessor of the channel adapter. The configuration information read unit 3-20 reads configuration information 3-17, which is held in the shared memory 3-10 (3-27). The configuration information 3-20 transfers read configuration information 3-17 as the response with respect to the command to read the area 3-22 to the control program 3-19 via the path through which the command is issued (3-27). The control program 3-19 transfers configuration information 3-17 acquired from the storage controller 1-1 to the application program 3-12 which calls the API 3-18 to read configuration information 3-17 (3-28).

By doing so, the application program 3-12 acquires configuration information 3-17 in the above-mentioned storage controller 1-1, such that it can see 1) the configuration of the host logical volume, 2) the configurations of the internal logical volumes, and 3) the correspondence relationships between the host logical volume and the internal logical volumes. That is, the application program 3-12 can see that the correspondence relationships between the host logical volume and the internal logical volumes are the relationships as shown in FIG. 5.

The application program 3-12 can see the correspondence relationships and switch the correspondence relationships, if necessary, at the time of data archive. The process of switching the host logical volume 34 into the internal logical volume 3-6, 3-7, 3-9, or 3-10 in such a manner will be described.

The application program 3-12 executed on the host apparatus 1-2 calls the API 3-18 to switch the associations between the host logical volume and the internal logical volumes in the storage controller 1-1 (3-24).

If the API 3-18 is called, the control program 3-19, which is similarly executed on the host apparatus 1-2, recognizes that the association switching between the host logical volume and the internal logical volumes is instructed. And then, the control program 3-19 transmits the command to write information required for the association switching (the number of the internal logical volume which is newly associated with the number of the host logical volume subject to switching) to the area 3-23 in the host logical volume (for control) 38, which is used for the association switching between the host logical volume and the internal logical volumes. The command is transmitted to the host logical volume (for control) 38 through the HBA 1-5 and the port 1-4 (3-25).

The command received by the channel adapter is processed in the program which is executed on the microprocessor of the channel adapter. Whenever the command is received from the host apparatus 1-2, the channel adapter operates based on the flowchart shown in FIG. 8. To begin with, the reception of the command is detected (6-1). And then, the type (for control/for data) of the host logical volume is examined (6-2). This is performed by examining configuration information of the host logical volume, which is held in configuration information 3-17, with the number of the host logical volume included in the command. Whether the host logical volume is for control or for data can be identified (6-3). Since the command is issued to the host logical volume (for control) 38, it is judged that the host logical volume is 'for control'. Next, the channel adapter examines the type of the command (read/write/others) (6-4). This is performed by examining a command code included in the command.

As a result, the channel adapter can identify whether the type of the command is read, write, or others (6-5). Since the command to write onto the area 3-23 of the host logical volume (for control) 38 is issued, it is judged that the type of the command is 'write'. Next, the channel adapter examines to which area of the host logical volume (for control) 38 the write operation is to be performed (6-9). This is performed by examining the number of a logical block included in the command.

As a result, the channel adapter can see the process to be performed (6-10). Since the area 3-23 which is allocated to the function of switching the association between the host logical volume and the internal logical volumes is designated, it is judged that the process to be performed is 'association switching between the host logical volume and the internal logical volumes'. And then, the channel adapter performs the association switching process 6-11 between the host logical volume and the internal logical volumes. The association switching process 6-11 between the host logical volume and the internal logical volumes is performed by the association switching control unit 3-14 which is the portion of the program executed on the microprocessor of the channel adapter.

As described above, the association switching is performed in cooperation with the execution of the application program (archive). According to the association switching, with respect to the HDD constituting the ECC group which is allocated to the internal logical volume of the first storage controller, the channel adapter of the first storage controller 1-1 performs the current application control of the HDD and the volume attribute control for the access control to the HDD.

Figure 9:
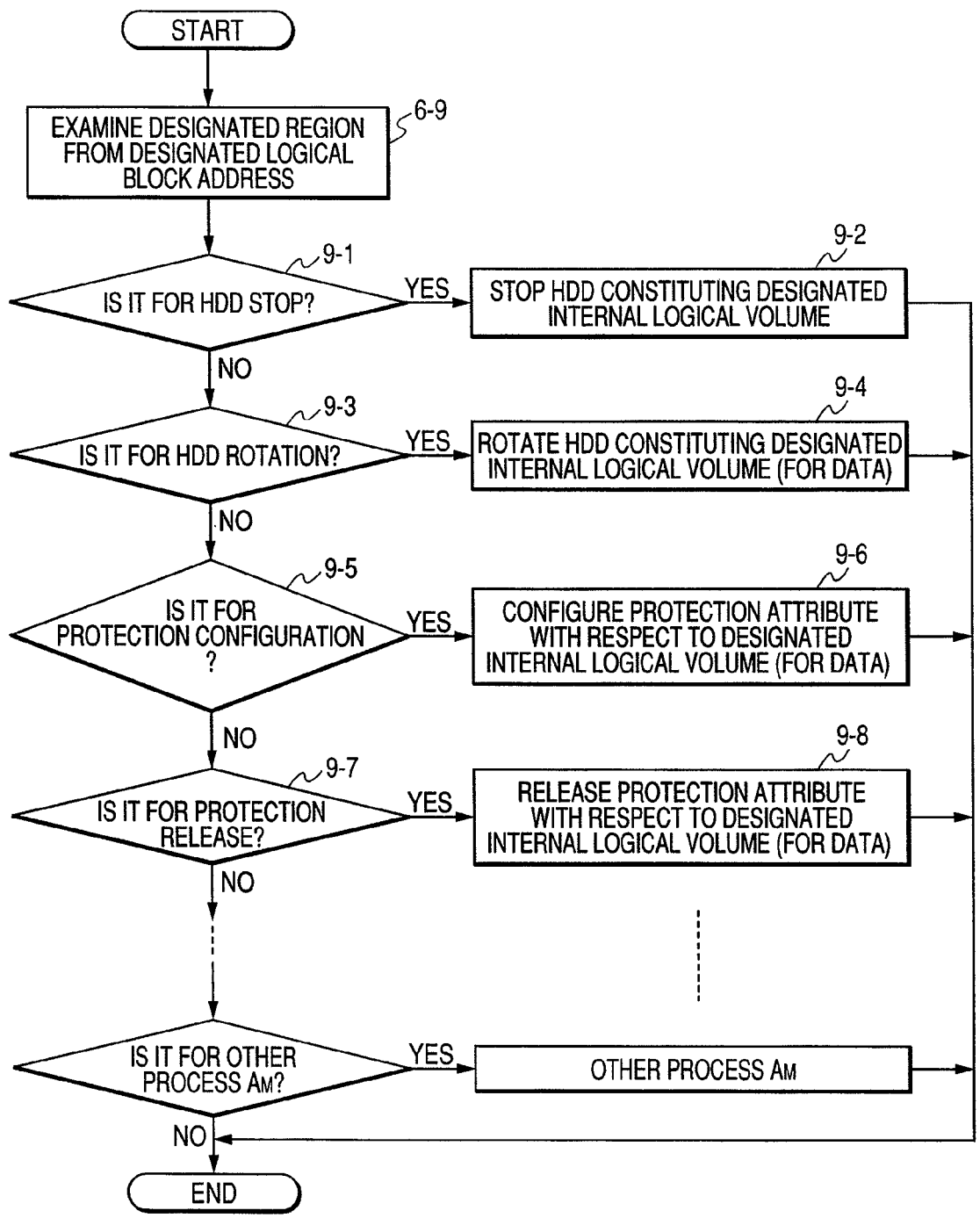
FIG. 9 is a flowchart showing a rotation/stop process of an HDD and protection attribute configuration/release of the HDD.

A controller 1-12 (see FIG. 1) of the channel adapter analyzes the command corresponding to the area 3-23A of the host logical volume (for control) 38 and performs the operations of FIG. 9. FIG. 9 shows a flowchart illustrating control operations on stop or rotation of the HDD, and configuration or release of the access protection attribute to the internal logical volume.

The controller of the channel adapter reads a designated area (the area 3-23A of the control logical volume 38) from a designated logical block address and examines a command code (step 6-9). At a step 9-1, if the command written into the control logical volume 38 is the command to stop the HDD, the controller performs the association switching process between the host logical volume and the internal logical volumes (the steps 6-10 and 6-11 in FIG. 8) and stops the HDD constituting the designated internal logical volume (9-2). At a step 9-3, it is determined whether or not the command is to rotate the HDD. If the command is to rotate the HDD, the controller switches into the designated internal logical volume and rotates the HDD constituting the internal logical volume (9-4). At a step 9-5, it is determined whether the command is a command to set up the protection. If it is the protection setup command, the protection attribute to the internal logical volume which is designated by the command is set up (9-6). At a step 9-7, if it is the protection setup release command, the protection setup corresponding to the designated internal logical volume is released.

Figure 10:
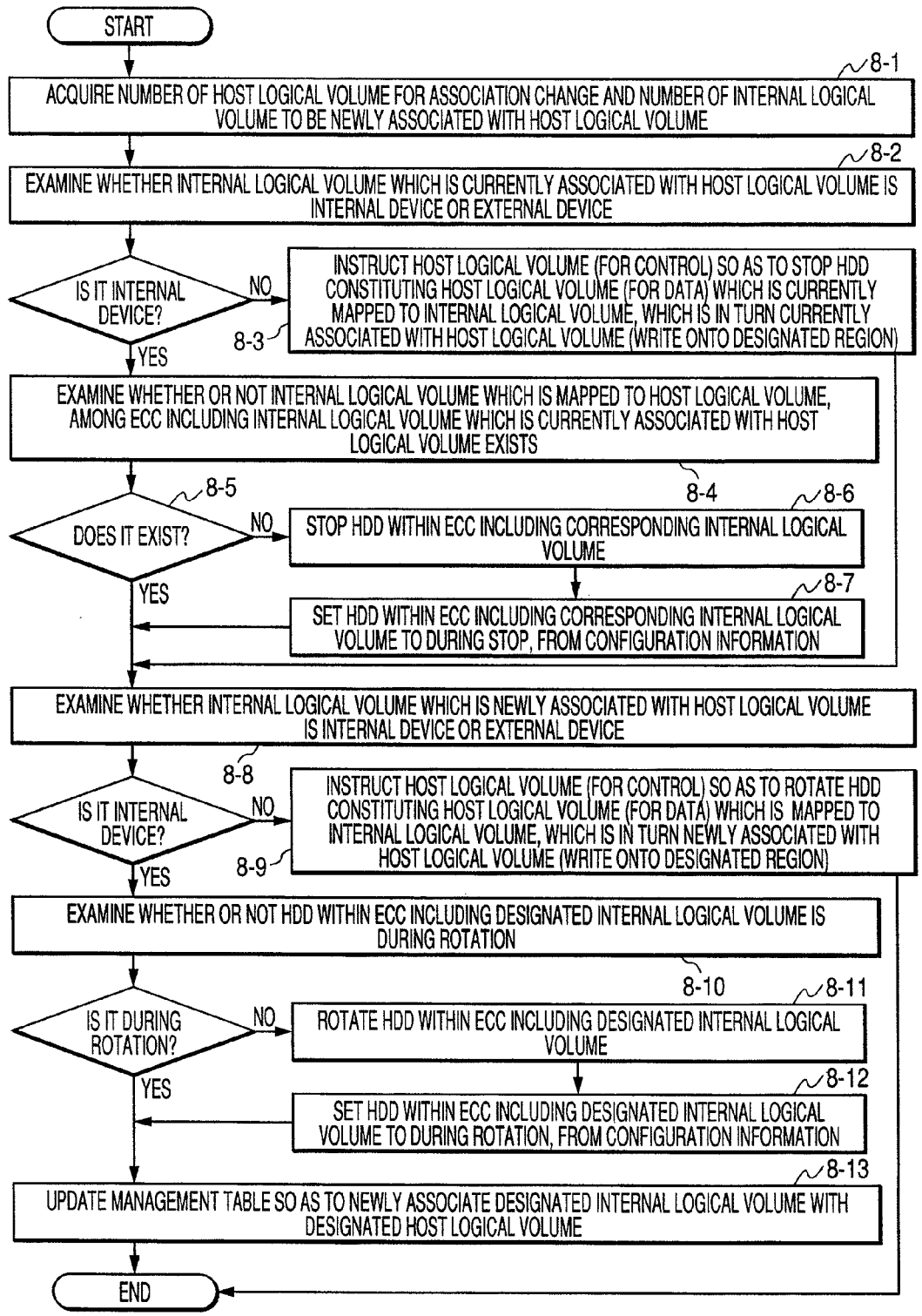
FIG. 10 is a flowchart showing details of the power supply control of the HDD.

The current application control of the spindle motor of the HDD will be described in detail with reference to the flowchart of FIG. 10. As described above, this control is achieved by the control unit 3-14 (see FIG. 3) which is implemented based on the microprocessor 1-12 (see FIG. 1) of the channel adapter 1-3 and the program stored in the local memory 1-13 (see FIG. 1).

A process to be first performed is an examination of information (the number of the host logical volume subject to the switching (it will be no longer associated) and the number of the internal logical volume to be newly associated) written in the area 3-23. Thus, the processor 1-12 (see FIG. 1) of the channel adapter 1-3 can acquire the number of the host logical volume which is subject to the association change of the first storage controller 1-1 and can see the number of the host logical volume of the external storage controller which newly corresponds to the host logical volume (8-1).

Next, the channel adapter 1-3 determines whether the internal logical volume which is currently associated with the host logical volume designated in the area 3-23 is a device built in the first storage controller 1-1 of FIG. 3 or a device of the external storage controller 10-1 (10-2) (external device) (8-2). This can be performed by allowing the channel adapter to refer to the above-mentioned table of FIG. 6 based on the number of the internal logical volume. As a result, the internal logical volumes 3-6, 3-7, and 3-8 in FIG. 3 are determined as the volume corresponding to the internal device and the internal logical volumes 3-9 and 3-10 are determined as one corresponding to the external device of the external storage controller 10.

At the step 8-2, the channel adapter refers to the table of FIG. 6 and determines whether or not the external storage controller can read the code of the command which is defined to the host logical volume (for control) of the channel adapter. If the determination is negative, the channel adapter can not control the attribute of the HDD of the second storage controller, and, thus, subsequent steps are not performed, thereby ending the process. Moreover, instead of or in addition to referring to the table of FIG. 6, the channel adapter may perform the following steps. The channel adapter transfers the inquiry command, which is described in FIG. 7, to the channel adapter 13A of the second storage controller 10-1 via the ports 14A and 11 (see FIG. 3). By data (device name or the like) and a response from the second storage controller, the channel adapter of the first storage controller sees that the second storage controller can not be controlled. At this time, when the second storage controller is connected to the host apparatus, in order to control the attribute of the logical volume of the second storage controller, a host apparatus 1-2 (#1) connected to the first storage controller 1-1 may transfer to a host apparatus (#2) an analyzable command on an operating system common to the host apparatuses (#1 and #2) under the control of the channel adapter 1-3 (see FIG. 1) and may control the attribute of the logical volume of the second storage controller through the host apparatus (#2) which is connected to the second storage controller. Hereinafter, it is assumed that the external storage controller 10-1 (10-2) will understand the command (the command recorded into the host logical volume (for control)) transmitted from the channel adapter 1-3 of the first storage controller 1-1. At the step 8-2, if it is determined that the internal logical volume serving as a switching source is the device of the external storage controller 10-1 (10-2), the channel adapter 1-3 of the first storage controller 1-1 transfers a command of an area 3-14A of the host logical volume 34 to the control logical volume 32A (30A of 10-2) of the second storage controller via the channel adapter of the external storage controller. The command includes a code for turning off the power supply of the HDD of the ECC group which corresponds to the host logical volume of the second storage controller 10-1 (10-2 has the same configuration as that of 10-1). Moreover, the port of the channel adapter of the first storage controller and the port of the channel adapter of the second storage controller are connected to each other via the fiber channel.

When the internal logical volume serving as the switching source is determined as the internal device, it is examined whether or not there are other internal logical volumes associated with the host logical volume among the ECC group including the internal logical volume which is currently associated with the host logical volume 34 (8-4). This is because the power supply of the HDD constituting the ECC group should not be turned off. This is performed by searching the number of the ECC group and the table, in which the number of each internal logical volume included in each ECC group is held, as exemplified in FIG. 6.

As the search result of the table exemplarily shown in FIG. 6, if it is determined that other internal logical volumes do not exist, the channel adapter issues the command to stop the spindle motor of the HDD, which belongs to the ECC group including the currently associated internal logical volume, to the host logical volume designated in the area 3-23 (8-5 and 8-6). This is performed by allowing the program executed on the microprocessor of the channel adapter to transmit the command to stop the spindle motor to the HDD which belongs to the corresponding ECC group.

Referring to FIG. 2, the command to stop the spindle motor is transmitted from the port 1-8 of the disk adapter 1-7 via the FC-AL of the fiber channel or the fabric which connects the HDD 1-6, a parallel SCSI, ATA, or S-ATA.

As an element determining the MTBF, which is the index of reliability of the HDD, the rotation time of the spindle motor is used. As disclosed in accordance with the invention, by stopping the spindle motor, the time until a failure to be inferred from the MTBF occurs can be extended. Further, from the result obtained at the step 8-4, it is understood that there is no host logical volume which is associated with the internal logical volume in the corresponding ECC group, and thus it can be considered that there is no access from the host apparatus. Thus, even when the spindle motor of the HDD belonging to the corresponding ECC group is stopped, there is no difficulty in working the host apparatus (8-7).

Next, the channel adapter determines whether the internal logical volume which is designated to be newly associated with the host logical volume designated in the area 3-23 is an internal device or an external device (8-8). If it is the external device, the channel adapter 1-3 issues a command to the control logical volume 32A (30A) of the external storage controller and rotates the HDD constituting the host logical volume (for data) 32 (30), which is mapped in the destination internal logical volume 3-10 to be newly associated with the host logical volume 34 (8-9). The determination on whether or not the external storage controller can recognize the command of the first storage controller is as described in the step 8-2.

Next, if it is determined that the internal logical volume to be newly associated is the internal device, at a step 8-10, it is examined whether or not the spindle motor of the HDD in the ECC group including the internal logical volume, which is designated to be newly associated, is under rotation. If it is determined that the spindle motor of the HDD in the ECC group including the internal logical volume which is designated to be newly associated with the host logical volume 34 designated in the area 3-23 is not under rotation, the channel adapter 1-3 rotates the spindle motor of the HDD which belongs to the ECC group including the internal logical volume being currently associated with the host logical volume designated in the area 3-23 (8-11).

Similar to the case in which the spindle motor of the HDD is stopped, this is performed by allowing the program executed on the microprocessor of the channel adapter to transmit the command to rotate the spindle motor to the HDD belonging to the corresponding ECC group. Referring to FIG. 2, the command to rotate the spindle motor is transmitted from the port 1-8 of the disk adapter 1-7 via the FC-AL or fabric of the fiber channel which connects the HDD 1-6, the parallel SCSI, the ATA, or the S-ATA.

Subsequently, the channel adapter performs an update process of configuration information 3-17 such that the HDD having the spindle motor that is rotating is present in the ECC group including the internal logical volume designated in configuration information 3-17 (8-12).

The channel adapter further performs an association process in which the internal logical volume similarly designated in the area 3-23 is newly associated with the host logical volume 34 designated in the area 3-23 by the association switching unit 3-13. This is performed by updating the table in which the correspondence between the number of the host logical volume and the number of the internal logical volume associated with that host logical volume is held (8-13). As such, the HDD power supply control of the ECC group constituting the internal logical volume which corresponds to the host logical volume 34 is achieved.

Next, specified details of a volume attribute control which is performed by the processor of the channel adapter that has received the command of the application program of the host apparatus 1-2 with respect to the logical volume will be described. The processor of the channel adapter reads a logical block corresponding to the area 3-14A of the host logical volume (for control) 38 and analyzes the stored command to perform the access protection configuration to the designated internal logical volume. The protection configuration is intended to prevent an unauthorized access to the host logical volume. If the access protection configuration is locked on the internal logical volume of the first storage controller 1-1, the host apparatus 1-2 connected to the first storage controller 1-1 can not access the external host logical volume 32, even when the access control is not set up to the external host logical volume 32 (30) that is mapped in the internal logical volume 3-10 on which the access control is locked.

However, a host apparatus which can access the logical volume is located in the fiber channel between the port of the first storage controller 1-1 and the port of the external storage controller 10, the host apparatus can access to the host logical volume 32 of the external storage controller 10-1 (or the host logical volume 30 of the external storage controller 10-2). Therefore, it is preferable that access control is also set up to the logical volume of the external storage controller 10-1 (10-2). The setup of the access control to the logical volume of the external storage controller can be made by allowing the microprocessor of the channel adapter 1-3 of the first storage controller 1-1 to transfer the command in the area 3-23A of the host logical volume (for control) 38 in the first storage controller to the control logical volume 32A (30A) of the external storage controller and by allowing the processor of the channel adapter in the external storage controller to execute the command.

Moreover, if the access control is not set up to the internal logical volume of the first storage controller corresponding to the volume of the external storage controller, the access for read and write operations can be made to the internal logical volume as viewed from the host apparatus 1-2. However, since the protection attribute is actually set up to the logical volume of the external storage controller, there is a problem in that the read and write operations of data are impossible.

When the second storage controller does not process the command code of the first channel adapter, the host apparatus connected to the first storage controller issues the command to the host apparatus connected to the external storage controller, and, thus, the volume attribute control can be added to the logical volume of the second storage controller.

Next, access control processes to the logical volumes of the first storage controller 1-1 and the external storage controller 10-1 (10-2) will be described in detail. FIG. 11 is a diagram illustrating the structure of an access attribute management table T3. The access attribute management table T3 associates the number of each of the internal logical volumes and the host logical volume (LU (logical unit)) with an access attribute control bit set on each logical volume. Further, with the access attribute management table T3, authorization information (password or the like) that allows only an authorized person to change the access attribute also can be associated. The access attribute management table T3 serves as a means for holding an access attribute mode which is set in every logical volume and also it serves as a means for inhibiting a configuration change of the access attribute mode by an unauthorized person. The access attribute management table T3 is secured by the number of logical volumes to be mounted.

The access attribute management table T3 has a Read inhibition bit, Write inhibition bit, Inquiry inhibition bit, Read Capacity 0 report bit, and S-vol Disable bit as information (access attribute mode information) for holding the access attribute mode, which is set on the corresponding logical volume for every logical volume number. S-vol represents a sub volume (secondary volume or copy destination volume) in application functions of the logical volume. As for the Read inhibition bit, '1' means that the reading of data from the corresponding internal logical volume is inhibited and '0' means that the read operation of data is possible. As for the Write inhibition bit, '1' means that the writing of data to the corresponding internal logical volume is inhibited and '0' means that the of writing data is possible. As for the Inquiry inhibition bit, '1' means that the recognition of the corresponding internal logical volume is inhibited and '0' means that the recognition is possible. As for the Read Capacity 0 report bit, '1' means that, as a response to a Read Capacity command with respect to the corresponding internal logical volume, the capacity of zero is reported and '0' means that an actual capacity is reported. As for the S-vol Disable bit, '1' means that an S-vol designation to the corresponding internal logical volume is inhibited and '0 means that the S-vol designation is possible.

FIG. 12A is a diagram illustrating the type of the access attribute set for every logical volume or the like. For each logical volume, six kinds of access attribute modes of (model) to (mode 6) described below can be set.

(Mode 1) Read/Write Possible

As shown in FIG. 12A, a host computer can perform read and write operations of data and recognition of the logical volume to which this access attribute mode is set.

(Mode 2) Read Only

As shown in FIG. 12A, the host computer can read data and can recognize the logical volume to which this access attribute mode is set. However, the writing of data is prohibited.

(Mode 3) Read/Write Impossible

As shown in FIG. 12A, the host computer is prohibited from performing read and write operations with respect to the logical volume to which this access attribute mode is set. However, the host computer can recognize the logical volume.

(Mode 4) Read Capacity 0

As shown in FIG. 12A, the host computer can recognize the logical volume to which this access attribute mode is set. However, with respect to the Read Capacity command from the host computer (a command to inquire the storage capacity of the logical volume), the response that the storage capacity is '0' is returned to the host computer. Therefore, read and write operations of data from and to the logical volume are impossible.

(Mode 5) Inquiry Inhibition

As shown in FIG. 12A, the host computer can not recognize the logical volume to which this access attribute mode is set. That is, with respect to the inquiry for recognizing the logical volume from the host computer, a response purporting that this logical volume does not exist is returned to the host computer. Therefore, read and write operations, and Read Capacity access or the like to the logical volume from the host computer are impossible. However, in a copy pairing operation which is performed by the disk array device as an internal function, the logical volume can be designated as a sub volume (secondary volume) to other logical volumes (S-vol designation).

(Mode 6) Secondary Volume Disable (S-vol Disable)

As shown in FIG. 12A, the logical volume to which this access attribute mode is set can not be designated as a secondary volume for copying other logical volumes. However, the read and write operations and recognition to the logical volume are possible.

FIG. 12A shows what access control is performed by the disk array device with respect to the logical volumes to which the six kinds of access attribute modes are respectively set. In FIG. 12A, a circle mark means that an access control to enable the corresponding operation is performed and an X mark means that an access control to disable the corresponding operation is performed. Further, 'actual capacity' and '0' regarding Read Capacity respectively represent that the content of the response to the host computer with respect to the Read Capacity command from the host computer is an actual capacity of the internal logical volume or capacity '0'.

FIG. 12B is a diagram illustrating correspondence relationships between the six kinds of access attribute modes and bit patterns of the access attribute control bits (Read inhibition bit, Write inhibition bit, Inquiry inhibition bit, Read Capacity 0 report bit, and S-vol Disable bit). In the access attribute management table T3, the access attribute control bits (access attribute mode information) are set in the bit patterns as shown in FIG. 12B, and, thus, the six kinds of access attribute modes described above are respectively set (or the setup of each mode is released).

FIG. 13 is a flowchart showing cooperation between an archive application program and a database application program. The application program (JOB management) which is executed by the host apparatus 1-2 of FIG. 3 starts the database engine 62 which is implemented by the program of the host apparatus 1-2 (13-1). If so, the database engine operates, and read/write operations to the database volume 36 are executed (13-2). After the command is ended, the JOB management program stops the database engine 62 (13-3).

In order to cause an unused internal logical volume to be allocated to the host logical volume, the JOB management program controls the association switching between them to the control program 1-19 via the API 3-18 (13-4).

Next, the JOB management program starts the archive server 60 (13-5) and copies data stored in the database volume 36 to the internal logical volume (at least one of 3-6, 3-7, 3-9, and 3-10) allocated as the archive logical volume (13-6). As a result, data is written onto the ECC group (3-3 and 3-4) or the host logical volume (30 or 32) in the external storage controller. Next, the JOB management program stops the archive process (13-7) and then sets up the above-mentioned access control to the archived logical volume. The steps 13-1 to 13-7 are preferably performed by measures, such as timer interruption, regularly and repetitively.

As described above, according to the embodiment of the invention, the power supply control and the access attribute control of the HDD can be performed with respect to the external link to the first storage controller. In addition, the spindle motor of the HDD, which uses the S-ATA as the link interface, of the storage controller externally connected is stopped except for read and write operations of data. Thus, it is expected that the time until the failure to be inferred from the MTBF occurs can be extended, as compared to the case where the HDD is used without stopping the spindle motor thereof.

Figure 14:
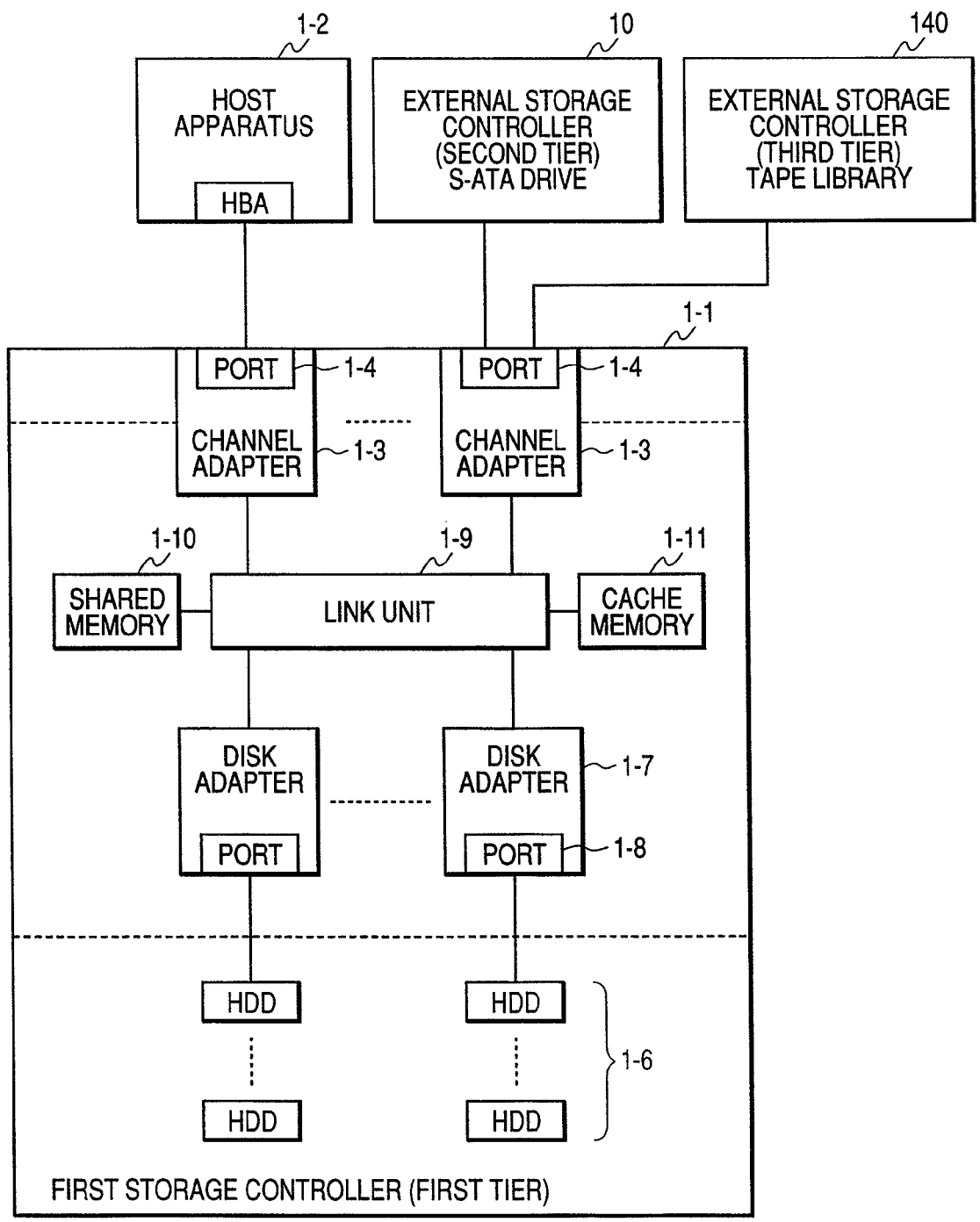
FIG. 14 is a block diagram showing an example of a link between a third storage controller and the first storage controller.

In the above-mentioned embodiment, the configuration where the second storage controller is connected to the first storage controller is described, but, in addition, the third storage controller may be connected to the first storage controller. Here, in the third storage controller, the storage device corresponds to a low-priced device, such as a tape device, as compared to the second storage controller. Referring to FIG. 14, the third storage controller is connected to the channel adapter of the first storage controller 1-1 via the port 1-4. Here, if the above-mentioned control logical volume 32 is not provided in the third storage controller, the read and write operations of data for archive are possible, but, with respect to the storage device of the third storage controller itself, the power supply control or access control of the driving unit of the storage device can not be set. In this case, the access control is set to only the internal logical volume of the first storage controller to which the storage device of the third storage controller is mapped.

The microprocessor in the channel adapter 1-3 of the first storage controller 1-1 can access the host logical volume (for data) 32 of the second storage controller via the port 1-4 and the channel adapter 1-3 and can write data to be archived onto the storage device of the third storage controller 140 or read archived data from the storage resource of the third storage controller 140.

Figure 15:
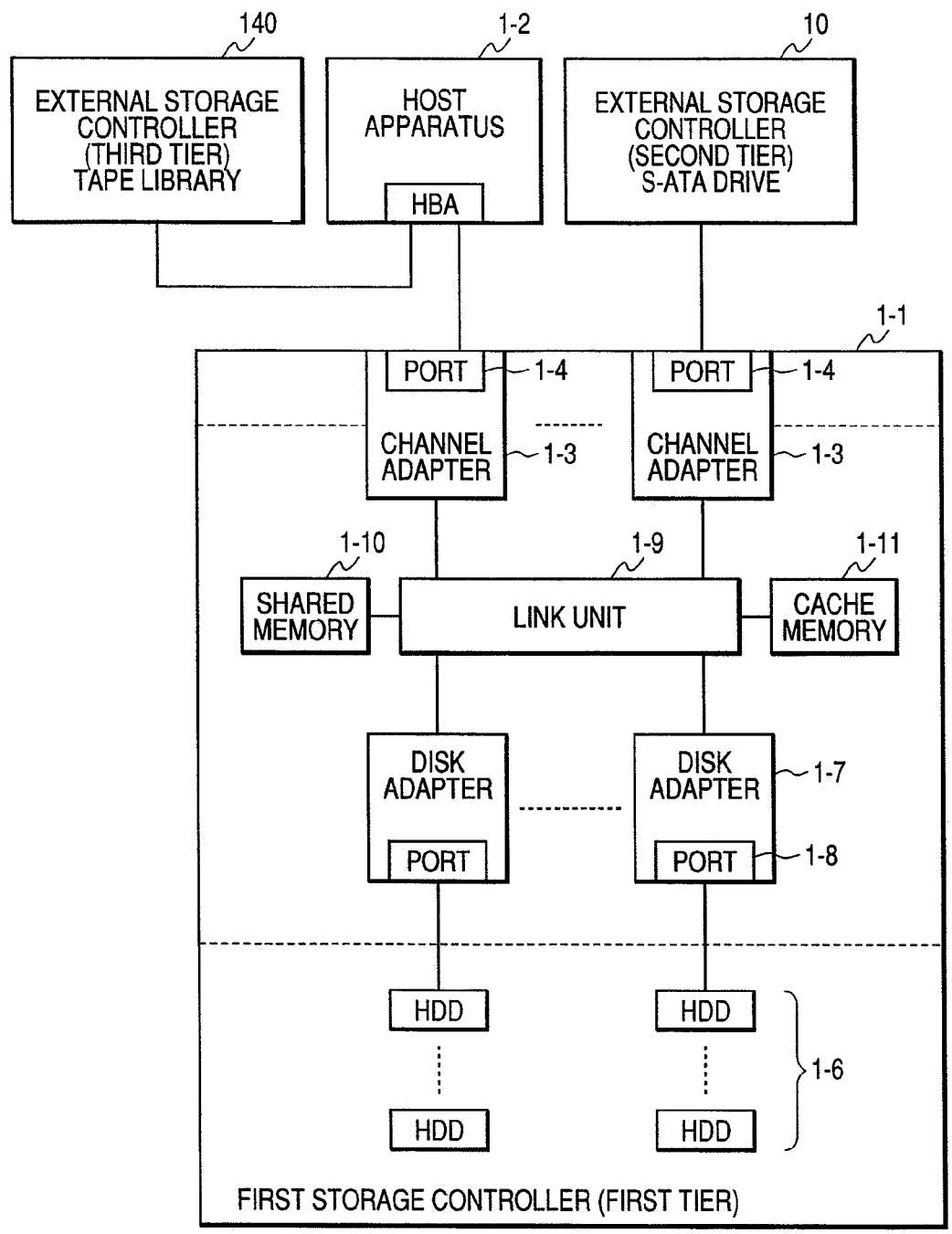
FIG. 15 is a block diagram showing a modification of FIG. 14.

FIG. 15 shows a state in which the third storage controller is connected to the host apparatus 1-2 via the HBA. As compared to the link system of FIG. 14, with the link system of FIG. 15, the read and write operations for archive can be performed directly from the host apparatus 1-2. The third storage controller may be connected to the channel adapter of the second storage controller.

As described above, by using the table of FIG. 6, the first storage controller can obtain information on the respective logical volumes and select the internal logical volume as a storage destination according to the severity of the data. For example, the internal logical volume which has a power supply-controllable disk device, has the longer MTBF and high reliability, and thus it can store reliable data, store unrewritten data in the internal logical volume, to which the access control is set, even in the second tier, or the like. Accordingly, the storage resources of the external storage controller can be allocated to fit data to be stored.

In conjunction with the above-mentioned embodiment, a example has been considered in which the host logical volume of the first storage controller has the archive logical volume and the database logical volume, but the invention is not limited to this example. For example, the host logical volumes corresponding to various application programs can be generated. Further, in the first storage controller, the internal logical volumes 3-6 and 3-7 corresponding to the host logical volume (for data) 34 is made to correspond to the internal HDDs, but they may be associated with the HDDs of the external storage controller.

Further, the power supply control and the volume attribute control of the HDD are described using the same flowchart, but the volume attribute control of the HDD may be performed separately from the power supply control of the HDD.

In conjunction with the above-mentioned embodiment, a configuration in which the internal logical volumes are associated with the host logical volume has been described. However, when the logical volume which the first storage controller 1-1 or the external storage controller (the second storage controller or third storage controller) provides to the host apparatus 1-2 is made of a single layer of the host logical volume, the control unit (the control logical volume 38 and the processor 1-12 of the channel adapter 1-3) of the first storage controller or the application program of the host apparatus may switch a plurality of host logical volumes and control the power supply or access attribute of the storage device associated with the corresponding host logical volume.

As for the switching of the internal logical volume corresponding to the host logical volume into the other internal logical volume, there are many aspects. For example, the switching between the internal logical volumes of the first storage controller 1-1, the switching between the internal logical volumes of the first storage controller 1-1 and the internal logical volumes of the external storage controller (the second storage controllers (10-1 and 10-2) or the third storage controller (140)), the switching between the internal logical volumes of the second storage controllers, or the switching between the internal logical volumes of the second external storage controller and the internal logical volumes of the third storage controller is exemplified.

If access is not made to a logical volume for a predetermined time, the control unit of the first storage controller or the host apparatus 1-2 can control the driving power supply of the storage device of the external storage controller constituting the logical volume from ON to OFF.

What we claim is:

1. A storage control system comprising:
a first storage controller being connected to a host system and having a channel adapter for providing one or more first logical volumes for being accessed by the host system, a first internal logical volume and a second internal logical volume, the second internal logical volume being associated by the first storage controller with one of said first logical volumes, the first and second internal logical volumes being configured to be used as storage areas for data transmitted to and received from the channel adapter, a plurality of disk drives being written with data with respect to the first internal logical volume as a group of data having a redundant relationship, and a disk adapter being connected to the plurality of disk drives and controlling the plurality of disk drives; and
a second storage controller connected to the first storage controller and including third logical volumes, wherein the first storage controller is configured to associate the second internal logical volume to one of the third logical volumes in the second storage controller,
wherein the first storage controller further includes a memory in which a table defining correspondence relationships between the second internal logical volume and the third logical volumes is stored, and the channel adapter is configured to access to the third logical volumes of the second storage controller based on the correspondence relationships of the table and to stop a power supply of a driving mechanism of a storage devices corresponding to the one of the third logical volumes which the first storage controller had associated with the second internal logical volume when the first storage controller switches the association between the one of said first logical volumes and the second internal logical volume, to an association between the one of said first logical volumes and the first internal logical volume.

2. A storage control system comprising:
a first storage controller being connected to a host system and having a channel adapter for providing one or more first logical volumes for being accessed by the host system, a first internal logical volume and a second internal logical volume, the second internal logical volume being associated by the first storage controller with one of said first logical volumes, the first and second internal logical volumes being configured to be used as storage areas for data transmitted to and received from the channel adapter, a plurality of disk drives being written with data with respect to the first internal logical volume as a group of data having a redundant relationship, and a disk adapter being connected to the plurality of disk drives and controlling the plurality of disk drives; and
a second storage controller connected to the first storage controller and including third logical volumes wherein the first storage controller is configured to associate the second internal logical volume to one of the third logical volumes in the second storage controller,
wherein, when the first storage controller switches the association between the one of said first logical volumes and the second internal logical volume to an association between the one of said first logical volumes and the first internal logical volume, the first storage controller transmits a command to stop a power supply to a storage device corresponding to the one of the third logical volumes which the first storage controller had associated with the second interval logical volume before the association was switched.

3. The storage control system according to claim 1,
wherein the first storage controller is configured to set up access controls for the second internal logical volume and the third logical volumes.

4. The storage control system according to claim 1,
wherein each of the first logical volumes has a data logical volume for storing data and a control logical volume having stored with control commands required for controlling each of the third logical volumes.

5. The storage control system according to claim 4,
wherein the control logical volume stores control commands for correspondence switching between the first logical volumes and the first and second internal logical volumes, and the channel adapter executes the correspondence switching between the first logical volumes and the first and second logical internal volumes based on the control commands.

6. The storage control system according to claim 5,
wherein the control logical volume stores the control commands for the correspondence switching between the first logical volumes and the first and second internal logical volumes, and the channel adapter executes the correspondence switching between the first logical volumes and the first and second internal logical volumes based on the control commands and turns on or off disk drives constituting the third logical volumes allocated to the switched first and second internal logical volumes based on the table.

7. The storage control system according to claim 1,
wherein the disk drives corresponding to the third logical volumes of the second storage controller are hard disk drives (HDD) which use serial advanced technology attachment (S-ATA) implementations as link interfaces.

8. The storage control system according to claim 4, wherein the channel adapter is configured to set up access controls for the first and second internal logical volumes according to storage control commands corresponding to the control logical volume and control accesses of the host system to the third logical volumes which are mapped in the second internal logical volumes.

9. The storage control system according to claim 4,
wherein the channel adapter is configured to set up access controls for the second internal logical volumes and the third logical volumes, which are mapped in the second internal logical volumes, according to storage control commands corresponding to the control logical volume and control accesses of the host system to the third logical volumes.

10. The storage control system according to claim 4,
wherein the second storage controller has a second channel adapter which is connected to the channel adapter of the first storage controller and provides the third logical volumes accessed by the channel adapter, and a plurality of disk drives in which data with respect to the third logical volumes is written as a group of data having redundant relationships, and each of the third logical volumes has a second data logical volume for storing data and a second control logical volume having stored with control commands required for controlling storage devices corresponding to the second data logical volume.

11. The storage control system according to claim 10,
wherein the control commands of the control logical volume of the first storage controller is set up in the second control logical volume, and controls of the storage devices corresponding to the third logical volumes are executed based on the control commands.

12. The storage control system according to claim 1, wherein a third storage controller is connected to the first storage controller through another channel adapter of the first storage controller.

13. The storage control system according to claim 1, wherein the host system is configured to execute an application program which serves as an archive server, the channel adapter of the first storage controller is configured to generate an archive logical volume with the data logical volume, the first and second internal logical volumes are configured to correspond to the archive logical volume, and when the host system sets up archive control commands in the control logical volume, the channel adapter determines the first and second internal logical volumes corresponding to the archive logical volume based on the commands of the control logical volume and further stores archive data in the third logical volumes which are mapped in the second logical volumes or reads archived data.

14. The storage control system according to claim 4,
wherein, when the second storage controller cannot recognize the control commands, the host system is configured to directly control the storage devices corresponding to the third logical volumes of the second storage controller.

15. The storage control system according to claim 1, wherein a third storage controller having storage resources is connected to the first storage controller only for writing, reading or accessing the archive data.

16. The storage control system according to claim 1, wherein the first storage controller has a plurality of the first and second internal logical volumes, some of which being associated with internal disks built in the first storage controller and others being associated with the third logical volumes of the second storage controller.

17. A first storage controller used for a storage control system which includes the first storage controller and a second storage controller as claimed in claim 1.

18. A control method of a storage control system including a first storage controller being connected to a host system and having a channel adapter for providing one or more first logical volumes for being accessed by the host system, a first internal logical volume and a second internal logical volume, the second internal logical volume being associated by the first storage controller with one of said first logical volumes, the first and second internal logical volumes being configured to be used as storage areas for data transmitted to and received from the channel adapter, a plurality of disk drives being written with data with respect to the first internal logical volume as a group of data having a redundant relationship, and a disk adapter being connected to the plurality of disk drives and controlling the plurality of disk drives and a second storage controller connected to the first storage controller and including third logical volumes, wherein the first storage controller is configured to associate the second internal logical volume to one of the third logical volumes in the second storage controller, in which the storage control system performs controls to the first and second storage controllers based on a request from a program of the host system, the control method comprising:

a step of allowing the first storage controller to access the third logical volumes based on information of a memory in which a table defining correspondence relationships between the second internal logical volume and the third logical volumes is stored, and to stop a power supply of a driving mechanism of a storage device corresponding to the one of the third logical volume, which the first storage controller had associated with the second internal logical volume, when the first storage controller switches the association between the one of said first logical volumes and the second internal logical volume to an association between the one of said first logical volumes and the first internal logical volume.

19. The control method of a storage control system according to claim 18, further comprising:

a step of allowing the first storage controller to set up access controls for at least one from the second logical volumes and the third logical volumes.

20. The control method of a storage control system according to claim 18, wherein the first control unit forms at least one first logical volume connected to the host system to provide a host logical volume and a plurality of second logical volumes to store data sent from the host system, the at least one first logical volume having a switchable association with the plurality of second logical volumes, and wherein the second control unit is configured to control the second storage device and to form a third logical volume associated with one of the second logical volumes.

21. The control method of a storage control system according to claim 20, wherein the first control unit is adapted to stop providing power to the second storage device corresponding to the third logical volume in response to a predetermined operation of the first control unit.

22. A storage system connected to a host system, comprising: a first storage device; and a first control unit providing a plurality of first logical volumes to the host system and configuring a first internal logical volume and a second internal logical volume, the second internal logical volume being associated with one of said first logical volumes, wherein the first control unit configures the first internal logical volume on the first storage device, wherein the storage system is connected to another storage system having a second storage device and a second control unit for executing control to configure a second logical volume on the second storage device, wherein the first control unit associates the second internal logical volume with the second logical volume in said another storage system, and wherein, when the first control unit switches the association between the one of said first logical volumes and the second internal logical volume to an association between the one of said first logical volumes and the first internal logical volume, the first control unit transmits a command to the other storage system so as to stop a power supply to the second storage device.

23. The storage controller according to claim 22, wherein the switching is performed based on at least one of a storage capacity of the first logical volume, a type of the first storage device, and an update date thereof.

24. A storage control system comprising:

a host system;

a first storage system being connected to the host system having a first storage device having its data accessed by the host system and a first control unit providing a plurality of first logical volumes to the host system and configuring a first internal logical volume and a second internal logical volume, the second internal logical volume being associated to one of said first logical volumes; and a second storage system being connected to the first storage system and having a second storage device which has its data accessed by the host system through the first storage system and a second control unit for executing control to configure a second logical volume on the second storage device, wherein the first control unit configures the first internal logical volume on the first storage device, wherein, the first control unit associates the second internal logical volume with the second logical volume in the second storage system, and wherein when the first control unit switches from the association between the one of said first logical volumes and the second internal logical volume to an association between the one of said first logical volumes and the first internal logical volume, the first control unit transmits a command to the second storage system so as to stop a power supply to the second storage device which is no longer the destination storage as a result of the switching.

* * * * *